United States Patent
Mizusaki

(10) Patent No.: US 10,831,065 B2
(45) Date of Patent: Nov. 10, 2020

(54) LIQUID CRYSTAL DISPLAY DEVICE, METHOD FOR PRODUCING LIQUID CRYSTAL DISPLAY DEVICE, AND MONOMER MATERIAL FOR RETARDATION LAYER

(71) Applicant: SHARP KABUSHIKI KAISHA, Osaka (JP)

(72) Inventor: Masanobu Mizusaki, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/296,115

(22) Filed: Mar. 7, 2019

(65) Prior Publication Data

US 2019/0278122 A1 Sep. 12, 2019

(30) Foreign Application Priority Data

Mar. 9, 2018 (JP) ................. 2018-043086

(51) Int. Cl.
| | |
|---|---|
| *G02F 1/13363* | (2006.01) |
| *G02F 1/1337* | (2006.01) |
| *G02F 1/1335* | (2006.01) |
| *G02F 1/1368* | (2006.01) |
| *C09K 19/54* | (2006.01) |
| *C09K 19/22* | (2006.01) |
| *C09K 19/20* | (2006.01) |
| *C08L 79/08* | (2006.01) |

(Continued)

(52) U.S. Cl.
CPC ...... *G02F 1/13363* (2013.01); *C09K 19/2014* (2013.01); *C09K 19/22* (2013.01); *C09K 19/542* (2013.01); *G02F 1/1368* (2013.01); *G02F 1/133528* (2013.01); *G02F 1/133723* (2013.01); *C08L 79/08* (2013.01); *C09K 2019/0448* (2013.01); *C09K 2019/548* (2013.01); *C09K 2323/00* (2020.08); *C09K 2323/02* (2020.08); *C09K 2323/03* (2020.08); *C09K 2323/035* (2020.08); *G02F 2001/133715* (2013.01); *G02F 2001/136222* (2013.01)

(58) Field of Classification Search
CPC .............. G02F 1/13363; G02F 1/1368; G02F 1/133528; G02F 1/133723; G02F 2001/136222; G02F 2001/133715; C09K 19/2014; C09K 19/524; C09K 2019/0448; C09K 2019/548; Y10T 428/10; Y10T 428/1005; Y10T 428/1036; Y10T 428/105
USPC ........... 428/1.1, 1.2, 1.33, 1.3; 349/117, 123
See application file for complete search history.

(56) References Cited

U.S. PATENT DOCUMENTS

2016/0108316 A1* 4/2016 Kurisawa .......... G02F 1/133707
349/106

FOREIGN PATENT DOCUMENTS

JP 2013-166780 A 8/2013

* cited by examiner

*Primary Examiner* — Ruiyun Zhang
(74) *Attorney, Agent, or Firm* — ScienBiziP, P.C.

(57) ABSTRACT

The present invention provides a liquid crystal display device that includes a retardation layer with excellent thermal stability and suppresses a decrease in contrast ratio caused by scattering even when the retardation layer has been formed by polymerizing reactive monomers. The liquid crystal display device includes a pair of substrates and a liquid crystal layer held between the substrates. At least one of the substrates includes a retardation layer that contains a polymer of at least one type of monomer. The at least one type of monomer includes a photo-alignment monomer represented by a certain formula.

9 Claims, 3 Drawing Sheets

(51) Int. Cl.
*G02F 1/1362* (2006.01)
*C09K 19/04* (2006.01)

LIQUID CRYSTAL DISPLAY DEVICE, METHOD FOR PRODUCING LIQUID CRYSTAL DISPLAY DEVICE, AND MONOMER MATERIAL FOR RETARDATION LAYER

CROSS-REFERENCE TO RELATED APPLICATIONS

The present application claims priority under 35 U.S.C. § 119 to Japanese Patent Application No. 2018-043086 filed on Mar. 9, 2018, the contents of which are incorporated herein by reference in their entirety.

BACKGROUND OF THE INVENTION

Field of the Invention

The present invention relates to liquid crystal display devices, methods for producing a liquid crystal display device, and monomer materials for a retardation layer.

Description of Related Art

Recently, techniques for forming a retardation layer in a liquid crystal display device have been studied. For example, a method for forming a retardation layer by polymerizing reactive monomers having been aligned by an alignment layer is known (e.g., JP 2013-166780 A).

BRIEF SUMMARY OF THE INVENTION

The inventor studied on techniques for forming a retardation layer in a liquid crystal display device in order to achieve clear visibility of display images in bright places (e.g., under natural light).

FIG. 4 is a schematic cross-sectional view of an example of a conventional liquid crystal display device in which a retardation layer is formed by a method using an alignment layer. As shown in FIG. 4, a liquid crystal display device 101 includes, in the order from the viewing surface side to the back surface side, a first linear polarizing plate 110, a color filter substrate 120, an alignment film 140a, a liquid crystal layer 130, an alignment film 140b, a thin film transistor array substrate 150, and a second linear polarizing plate 160.

The color filter substrate 120 includes, in the order from the viewing surface side to the back surface side, a support substrate 121, a color filter/black matrix 122, an alignment layer 190, and a retardation layer 123.

The retardation layer 123 is formed by the method as shown in FIG. 5A, FIG. 5B, and FIG. 5C, for example. FIG. 5A, FIG. 5B, and FIG. 5C are schematic cross-sectional views for illustrating a method for forming a retardation layer using an alignment layer.

First, as shown in FIG. 5A, the alignment layer 190 is formed on the surface of the color filter/black matrix 122. The alignment layer 190 is then subjected to alignment treatment such as rubbing treatment or photo-alignment treatment. The alignment layer 190 is formed of, for example, a polyimide (polyamic acid). Next, a monomer material (solution) containing reactive monomers is applied to the surface of the alignment layer 190 to form a film 123a containing the reactive monomers as shown in FIG. 5B. Then, the film 123a is heated in order to polymerize the reactive monomers, whereby the film 123a is cured. Finally, the retardation layer 123 as shown in FIG. 5C is formed.

However, studies by the inventor revealed that forming the retardation layer 123 using the alignment layer 190 involves the following issues (A) to (D).

(A) Conventional reactive monomers align along the direction given by the alignment treatment performed to the alignment layer 190 and are incapable of self-alignment.

(B) The alignment layer 190 is formed on only one side of the film 123a (retardation layer 123) and thus the alignment control force thereof is insufficient. Accordingly, a film 123a with a large thickness (e.g., about 1 µm) deteriorates the alignability of the reactive monomers to increase the randomness thereof.

(C) Deteriorated alignability and increased randomness of the reactive monomers decrease the thermal stability. Specifically, the energy for disturbing the alignment of the reactive monomers by heat exceeds the energy for stabilizing the alignment, which further deteriorates the alignability of the reactive monomers. The retardation of the retardation layer 123 obtained by polymerizing the reactive monomers is thus reduced by baking for alignment film 140a formation or tends to be changed (reduced) by long-term use.

(D) Deteriorated alignability of the reactive monomers tends to increase scattering on the retardation layer 123, leading to a reduced contrast ratio of the liquid crystal display device.

An alignment layer 190 having undergone rubbing treatment causes the reactive monomers to have a pre-tilt angle of at least about 1°. This may cause insufficient retardation of the retardation layer 123, or the retardation may be influenced by the viewing angle.

An alignment layer 190 having undergone photo-alignment treatment is given weak alignment control force to the retardation layer 123 and thus reduces the retardation of the retardation layer 123 with time. The retardation layer 123 may have insufficient function after long-term use.

The present invention was devised under the current situation in the art and aims to provide a liquid crystal display device that includes a retardation layer with excellent thermal stability and suppresses a decrease in contrast ratio caused by scattering even when the retardation layer has been formed by polymerizing reactive monomers; a method for producing a liquid crystal display device suitable for production of the liquid crystal display device; and a monomer material for a retardation layer suitable for formation of the retardation layer.

The inventor made various studies on techniques for forming a retardation layer in a liquid crystal display device and found that use of a photo-alignment monomer whose molecules are aligned by polarized light irradiation as a reactive monomer for retardation layer formation achieves excellent alignability. The inventor thereby found a means for the above issues to complete the present invention.

In other words, an aspect of the present invention may be a liquid crystal display device including: a pair of substrates, and a liquid crystal layer held between the substrates, at least one of the substrates including a retardation layer that contains a polymer of at least one type of monomer, the at least one type of monomer including a photo-alignment monomer represented by the following formula (1).

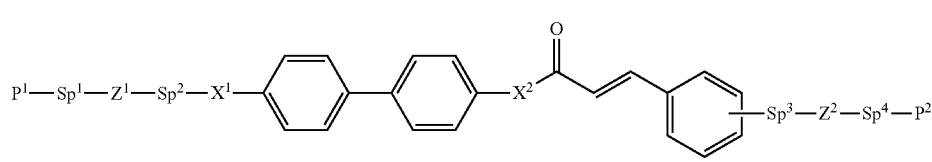

(1)

In the formula (1), $P^1$ and $P^2$ are the same as or different from each other and each represent an acrylic group or a methacrylic group; $Sp^1$, $Sp^2$, $Sp^3$, and $Sp^4$ are the same as or different from each other and each represent —O—, —S—, —NH—, —COO—, —COO—, —NHCO—, —CONH—, —NHCS—, —CSNH—, or a direct bond; $Z^1$ and $Z^2$ are the same as or different from each other and each represent a C1-C12 linear, branched, or cyclic alkylene group, or a direct bond; $X^1$ and $X^2$ are the same as or different from each other and each represent —NH— or —O—; and any hydrogen atom in the biphenyl group may be replaced by a fluorine atom.

Another aspect of the present invention may be a method for producing a liquid crystal display device that includes a liquid crystal layer and a substrate with a retardation layer, the method including: forming a film that contains at least one type of monomer including a photo-alignment monomer represented by the following formula (1), and irradiating the film with polarized light to align and polymerize molecules of the photo-alignment monomer and thereby forming the retardation layer.

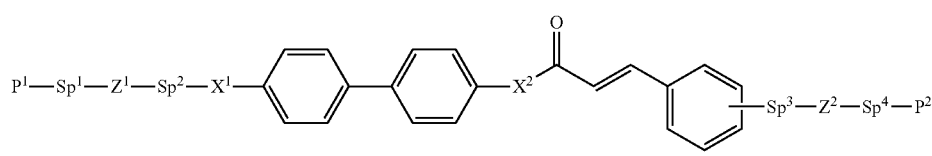

(1)

In the formula (1), $P^1$ and $P^2$ are the same as or different from each other and each represent an acrylic group or a methacrylic group; $Sp^1$, $Sp^2$, $Sp^3$, and $Sp^4$ are the same as or different from each other and each represent —O—, —S—, —NH—, —COO—, —COO—, —NHCO—, —CONH—, —NHCS—, —CSNH—, or a direct bond; $Z^1$ and $Z^2$ are the same as or different from each other and each represent a C1-C12 linear, branched, or cyclic alkylene group, or a direct bond; $X^1$ and $X^2$ are the same as or different from each other and each represent —NH— or —O—; and any hydrogen atom in the biphenyl group may be replaced by a fluorine atom.

Still another aspect of the present invention may be a monomer material for a retardation layer, containing at least one type of monomer including a photo-alignment monomer represented by the following formula (1).

In the formula (1), $P^1$ and $P^2$ are the same as or different from each other and each represent an acrylic group or a methacrylic group; $Sp^1$, $Sp^2$, $Sp^3$, and $Sp^4$ are the same as or different from each other and each represent —O—, —S—, —NH—, —COO—, —COO—, —NHCO—, —CONH—, —NHCS—, —CSNH—, or a direct bond; $Z^1$ and $Z^2$ are the same as or different from each other and each represent a C1-C12 linear, branched, or cyclic alkylene group, or a direct bond; $X^1$ and $X^2$ are the same as or different from each other and each represent —NH— or —O—; and any hydrogen atom in the biphenyl group may be replaced by a fluorine atom.

The present invention can provide a liquid crystal display device that includes a retardation layer with excellent thermal stability and suppresses a decrease in contrast ratio caused by scattering even when the retardation layer has been formed by polymerizing reactive monomers; a method for producing a liquid crystal display device suitable for production of the liquid crystal display device; and a monomer material for a retardation layer suitable for formation of the retardation layer.

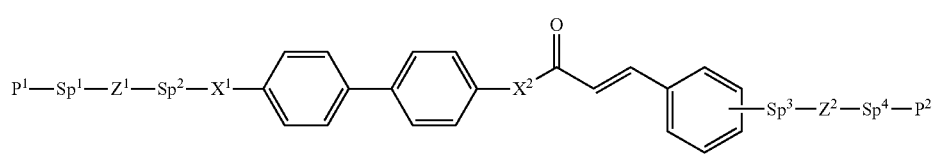

(1)

DETAILED DESCRIPTION OF THE INVENTION

The present invention is described in more detail based on embodiments with reference to the drawings. The embodiments, however, are not intended to limit the present invention. The configuration of each embodiment may appropriately be combined with each other or modified within the spirit of the present invention.

The expression "X to Y" herein means "X or more and Y or less".

Embodiment 1

Figure 1:
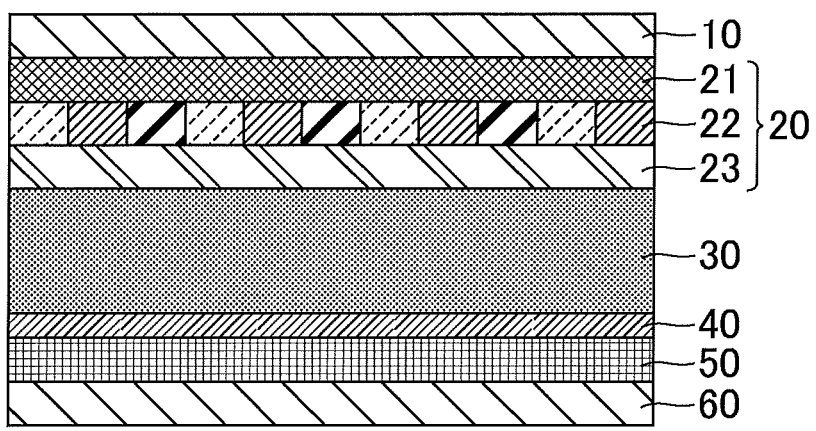
FIG. 1 is a schematic cross-sectional view of a liquid crystal display device of Embodiment 1.

FIG. 1 is a schematic cross-sectional view of a liquid crystal display device of Embodiment 1. As shown in FIG. 1, a liquid crystal display device 1a includes, in the order from the viewing surface side to the back surface side, a first linear polarizing plate 10, a color filter substrate 20, a liquid crystal layer 30, an alignment film 40, a thin film transistor array substrate 50, and a second linear polarizing plate 60.

The "viewing surface side" herein means the side closer to the screen (display surface) of a liquid crystal display device and is, for example, the upper side (first linear polarizing plate 10 side) of the liquid crystal display device 1a in FIG. 1. The "back surface side" herein means the side remote from the screen (display surface) of a liquid crystal display device and is, for example, the lower side (second linear polarizing plate 60 side) of the liquid crystal display device 1a in FIG. 1.

<First Linear Polarizing Plate and Second Linear Polarizing Plate>

Examples of the first linear polarizing plate 10 and the second linear polarizing plate 60 include a polarizer (absorptive polarizing plate) formed by dyeing a polyvinyl alcohol film with an anisotropic material such as an iodine complex (or dye) to adsorb the anisotropic material on the film and then stretch-aligning the film. In order to ensure the mechanical strength and the moisture and heat resistance, each side of the polyvinyl alcohol film is typically covered with a protective film such as a triacetyl cellulose film for practical use.

The transmission axis of the first linear polarizing plate 10 and the transmission axis of the second linear polarizing plate 60 are preferably perpendicular to each other. This allows the first linear polarizing plate 10 and the second linear polarizing plate 60 to be arranged in the crossed Nicols, which effectively achieves black display with no voltage applied to the liquid crystal layer 30 and gray-scale display (e.g., intermediate gray-scale display, white display) with voltage applied to the liquid crystal layer 30. The expression two axes are perpendicular to each other herein means the angle formed by the two axes is 87° to 93°, preferably 89° to 91°, more preferably 89.5° to 90.5°, particularly preferably 90° (perfectly perpendicular with each other).

<Color Filter Substrate>

The color filter substrate 20 includes, in the order from the viewing surface side to the back surface side, a support substrate 21, a color filter/black matrix 22, and a retardation layer 23.

Examples of the support substrate 21 include a transparent substrate such as a glass substrate or a plastic substrate.

The color filter/black matrix 22 includes red color filters, green color filters, and blue color filters in a plane, and the individual color filters are partitioned by a black matrix. The color filter/black matrix 22 may be coated with an overcoat layer (transparent resin) that functions as a flattening layer.

Examples of the material for the red color filters, green color filters, blue color filters, and black matrix include a resin (color resist) containing a pigment. The color combination of the color filter is not limited to the combination of red, green, and blue, and may be a combination of red, green, blue, and yellow, for example.

The retardation layer 23 includes a polymer of at least one type of monomer. The retardation layer 23, which is disposed on the side closer to the liquid crystal layer 30 than the support substrate 21 (between the support substrate 21 and the liquid crystal layer 30), is also referred to as an in-cell retardation layer.

The "retardation layer" herein means a retardation layer that gives an in-plane retardation of 10 nm or longer to at least light with a wavelength of 550 nm. The "retardation" herein means an in-plane retardation to light with a wavelength of 550 nm, unless otherwise specified. Light with a wavelength of 550 nm is light having a wavelength at which the human visual sensitivity is highest. The in-plane retardation Re of a retardation layer is defined by the formula: Re=(ns−nf)×d. In the formula, ns represents nx or ny, whichever is greater, and nf represents nx or ny, whichever is smaller, wherein nx and ny each represent a principal refractive index in an in-plane direction of the retardation layer, and d represents the thickness of the retardation layer. The principal refractive index is a value for light with a wavelength of 550 nm unless otherwise specified. In the retardation layer, the in-plane slow axis is the axis in the direction corresponding to ns and the in-plane fast axis is the axis in the direction corresponding to nf. The retardation of the retardation layer 23 is defined by Δn×d, i.e., the product of the birefringence Δn of the polymer forming the retardation layer 23 and the thickness d of the retardation layer 23.

The at least one type of monomer forming the polymer in the retardation layer 23 includes a photo-alignment monomer (bifunctional monomer) represented by the formula (1)

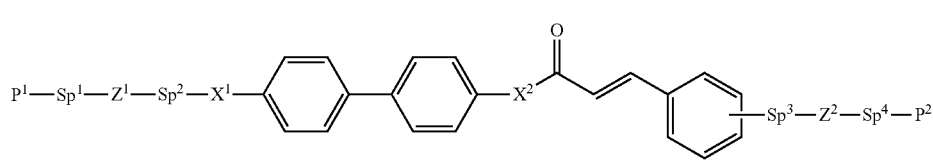

(1)

In the formula (1), $P^1$ and $P^2$ are the same as or different from each other and each represent an acrylic group or a methacrylic group; $Sp^1$, $Sp^2$, $Sp^3$, and $Sp^4$ are the same as or different from each other and each represent —O—, —S—, —NH—, —COO—, —COO—, —NHCO—, —CONH—, —NHCS—, —CSNH—, or a direct bond; $Z^1$ and $Z^2$ are the same as or different from each other and each represent a C1-C12 linear, branched, or cyclic alkylene group, or a direct bond; $X^1$ and $X^2$ are the same as or different from each other and each represent —NH— or —O—; and any hydrogen atoms in the biphenyl group may be replaced by a fluorine atom.

The photo-alignment monomer represented by the formula (1) (hereinafter, also simply referred to as "photo-alignment monomer") is a reactive monomer that contains a mesogenic moiety in a molecule, i.e., a reactive mesogen monomer, and shows alignability by polarized light irradiation. Specifically, the photo-alignment monomer contains a cinnamate group as a photo-functional group, and thus molecules thereof are capable of self-alignment. The cinnamate group shows alignability by absorbing polarized UV light, for example. Thus, there is no need to dispose an alignment layer for aligning photo-alignment monomers. Such photo-alignment monomers are aligned in the polarized light-irradiated direction. This enables uniform alignment in the thickness direction of the retardation layer 23 regardless of the thickness of the retardation layer 23. Use of photo-alignment monomers thus more improves the alignability in the entire retardation layer 23 than the conventional case of providing an alignment layer on only one side of the retardation layer to control the alignment of reactive monomers. This allows the retardation of the retardation layer 23 to be less likely to change (decrease) even after long-term use and improves the thermal stability. This also improves the alignability of the mesogenic moiety in the retardation layer 23, thereby suppressing a decrease in contrast ratio caused by scattering. Moreover, the photo-alignment monomer contains, as shown in the formula (1), a biphenyl group with liquid crystallinity as well as a flexible cinnamate group functioning as a photo-functional group. This structure achieves sufficiently stabilized alignability of the photo-alignment monomer while increasing the rigidity thereof, leading to significantly improved thermal stability of the retardation layer 23.

Preferred specific examples of the photo-alignment monomer include those represented by the following formula (2-1), (2-2), (2-3), (2-4), (2-5), (2-6), or (2-7).

(2-1)

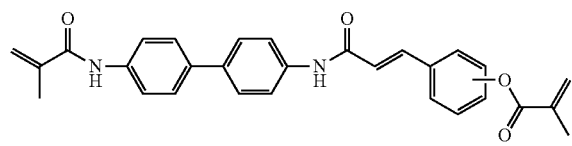

(2-2)

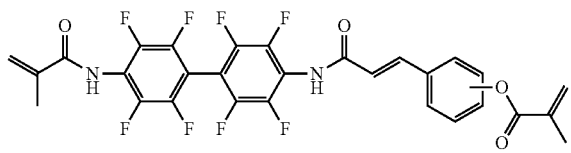

(2-3)

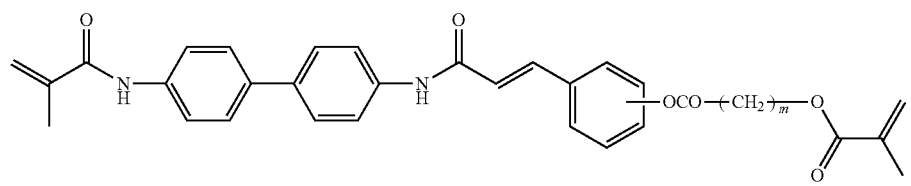

(2-4)

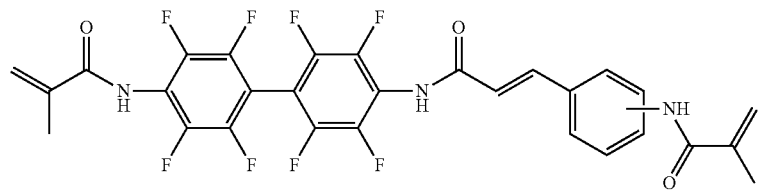

(2-5)

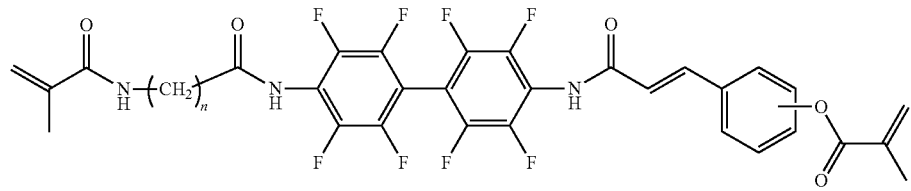

(2-6)

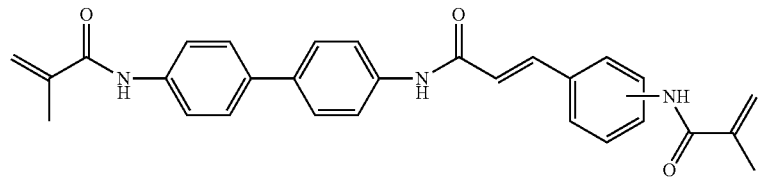

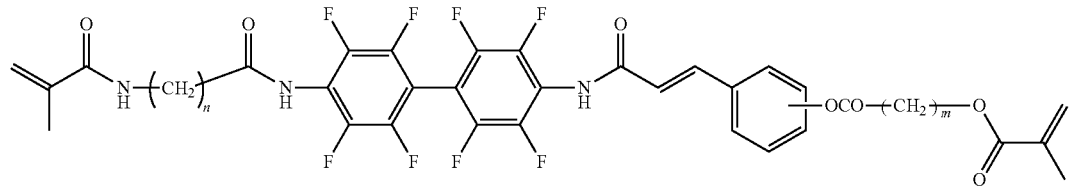
(2-7)
Any methacrylic group in the formulas (2-1), (2-2), (2-3), (2-4), (2-5), (2-6), and (2-7) may be replaced by an acrylic group. In the formulas (2-3), (2-5), and (2-7), m and n are the same as or different from each other and each represent an integer of 1 to 12.
Preferred specific examples of the photo-alignment monomer represented by the formula (2-1), (2-2), (2-3), (2-4), (2-5), (2-6), or (2-7) include those represented by the following formula (3-1), (3-2), (3-3), (3-4), (3-5), (3-6), or (3-7).
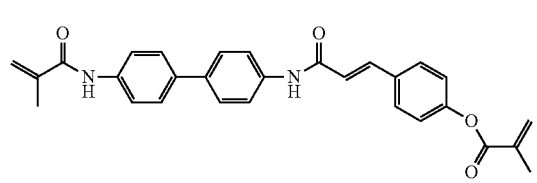
(3-1)
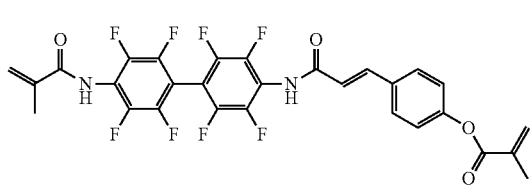
(3-2)
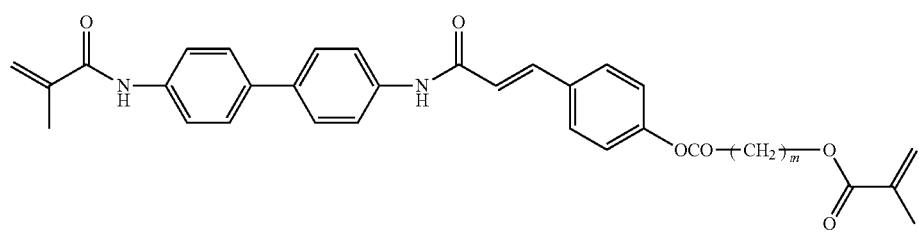
(3-3)
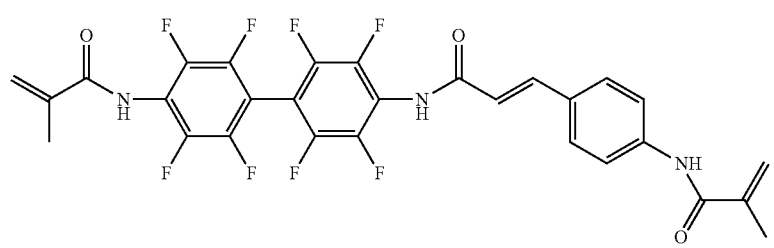
(3-4)
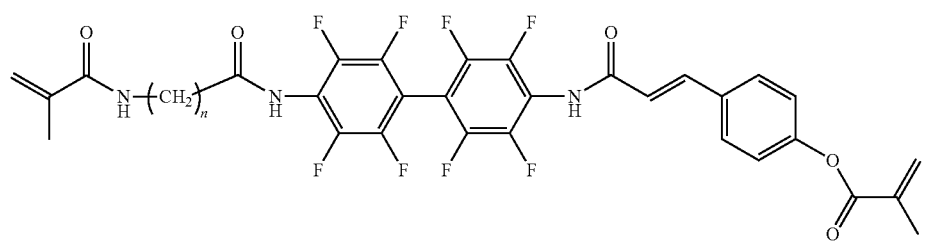
(3-5)
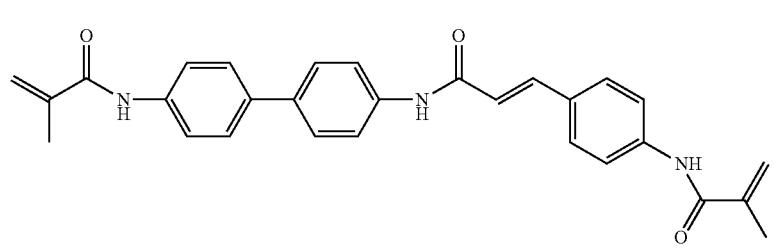
(3-6)

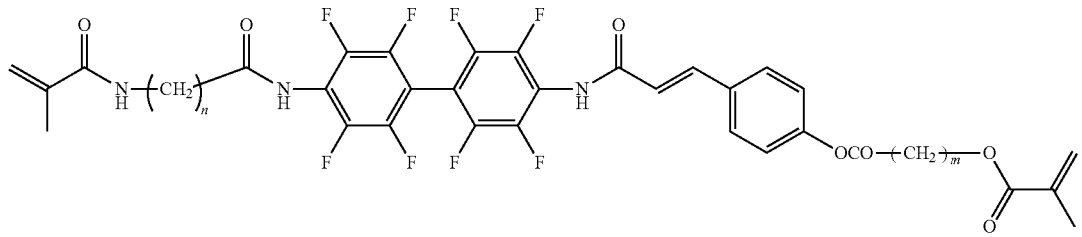

(3-7)

Any methacrylic group in the formulas (3-1), (3-2), (3-3), (3-4), (3-5), (3-6), and (3-7) may be replaced by an acrylic group. In the formulas (3-3), (3-5), and (3-7), m and n are the same as or different from each other and each represent an integer of 1 to 12.

As shown in the above specific examples, a photo-alignment monomer containing an amino group and an amide group causes intermolecular hydrogen bonding to increase the thermal stability of the retardation layer 23. An example of intermolecular hydrogen bonding caused in a photo-alignment monomer is illustrated by the following formula (H).

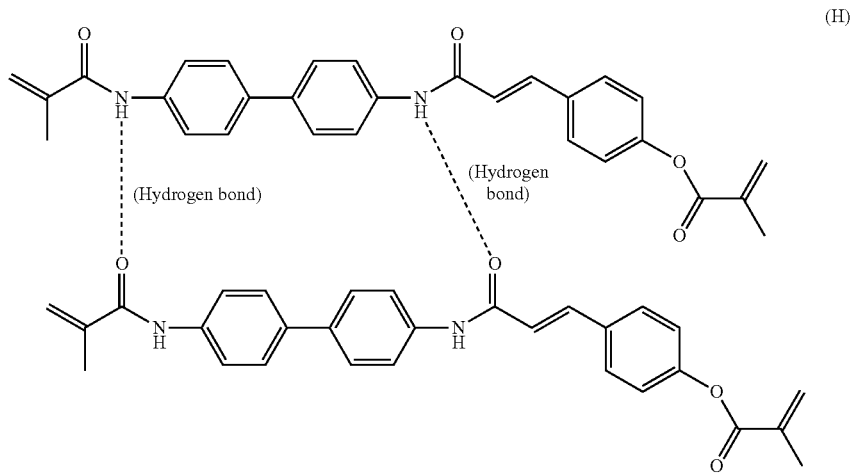

(H)

In order to improve the thermal stability of the retardation layer 23, as shown in the formulas (2-2), (2-4), (2-5), and (2-7) (formulas (3-2), (3-4), (3-5), and (3-7)), hydrogen atoms in the biphenyl group constituting the photo-alignment monomer are preferably replaced by fluorine atoms.

The retardation layer 23 is preferably a λ/4 retardation layer that gives an in-plane retardation of a wavelength of ¼ to at least light with a wavelength of 550 nm. Specifically, a λ/4 retardation layer that gives an in-plane retardation of 100 to 176 nm is preferred. When the retardation layer 23 is a λ/4 retardation layer, the angle formed by the in-plane slow axis of the retardation layer 23 and the transmission axis of the first linear polarizing plate 10 is preferably 45°. This allows the combination of the retardation layer 23 and the first linear polarizing plate 10 to function as a circular polarizing plate. The circular polarizing plate has an anti-reflection effect which suppresses internal reflection of the liquid crystal display device 1a, thereby significantly improving the visibility of display images in bright places (e.g., under natural light). The expression that the angle formed by two axes (directions) is 45° herein means the angle formed by the two axes is 42° to 48°, preferably 44° to 46°, more preferably 44.5° to 45.5°, particularly preferably 45°.

Figure 2A:
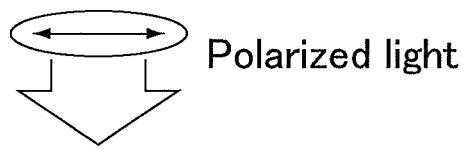
FIG. 2A and FIG. 2B are schematic cross-sectional views for illustrating a method for forming a retardation layer using a photo-alignment monomer.
Figure 2A:
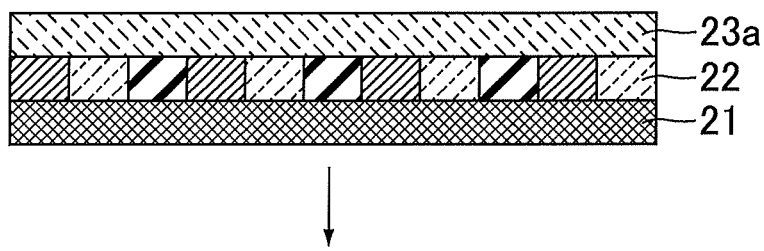
Figure 2B:
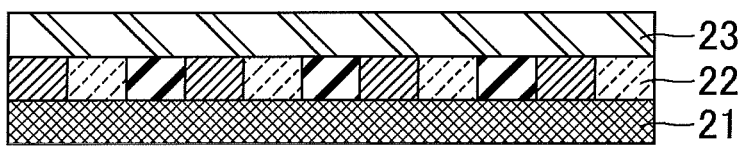

The retardation layer 23 may be formed by the method as shown in FIG. 2A and FIG. 2B. FIG. 2A and FIG. 2B are schematic cross-sectional views for illustrating a method for forming a retardation layer using a photo-alignment monomer.

First, a monomer material (solution) for a retardation layer containing a photo-alignment monomer is applied to the surface of the color filter/black matrix 22 to form a film 23a containing the photo-alignment monomer as shown in FIG. 2A.

Examples of the solvent used in preparation of the monomer material for a retardation layer include propylene glycol monomethyl ether acetate, toluene, ethyl benzene, ethylene glycol monomethyl ether, ethylene glycol dimethyl ether, propylene glycol methyl ether, dibutyl ether, acetone, methyl ethyl ketone, ethanol, propanol, cyclohexane, cyclopentanone, methyl cyclohexane, tetrahydrofuran, dioxane, cyclohexanone, n-hexane, ethyl acetate, butyl acetate, methoxy butyl acetate, N-methylpyrrolidone, and dimethyl acetamide. These solvents may be used alone or in combination of two or more thereof.

Next, as shown in FIG. 2A, the film 23a is irradiated with polarized light (e.g., polarized UV light) while being heated at a temperature not lower than the nematic-isotropic phase transition temperature of the photo-alignment monomer, whereby molecules of the photo-alignment monomer are aligned and polymerized. As a result, the film 23a is cured into the retardation layer 23 as shown in FIG. 2B.

In the curing of the film 23a, the polarized light irradiation may be followed by baking (heat treatment) for completing the polymerization of the photo-alignment monomer and removing the solvent.

The surface of the retardation layer 23 may be subjected to rubbing treatment. This causes the retardation layer 23 to exhibit alignment control force to liquid crystal molecules in the liquid crystal layer 30. In the retardation layer 23, molecules of the photo-alignment monomer are uniformly aligned in the entire layer as well as on the surface. Accordingly, rubbing treatment to the surface of the retardation layer 23 causes no reduction in retardation due to disturbance of the alignment of molecules of the photo-alignment monomer. The rubbing treatment to the retardation layer 23 is preferably performed in the 45° direction with respect to the in-plane slow axis of the retardation layer 23.

<Thin Film Transistor Array Substrate>

The thin film transistor array substrate 50 may be, for example, an active matrix substrate typically used in the field of liquid crystal display devices. In a fringe field switching (FFS)-mode liquid crystal display device 1a, the thin film transistor array substrate 50 includes, for example, a support substrate, a common electrode (planar electrode) disposed on the liquid crystal layer 30 side surface of the support substrate, an insulating film covering the common electrode, and pixel electrodes (slit electrodes) disposed on the liquid crystal layer 30 side surface of the insulating film. Here, when voltage is applied between the common electrode and the pixel electrodes (with voltage applied), a transverse electric field (fringe electric field) is generated in the liquid crystal layer 30, which controls the alignment of liquid crystal molecules in the liquid crystal layer 30. In an in-plane switching (IPS)-mode liquid crystal display device 1a, when voltage is applied between paired comb electrodes disposed on the thin film transistor array substrate 50 (with voltage applied), a transverse electric field is generated in the liquid crystal layer 30, which controls the alignment of liquid crystal molecules in the liquid crystal layer 30.

<Alignment Film>

The alignment film 40 may be a horizontal alignment film typically used in the field of liquid crystal display devices, for example. A horizontal alignment film aligns liquid crystal molecules in the liquid crystal layer 30 in the direction parallel to its surface. The expression that liquid crystal molecules are aligned in the direction parallel to the surface of the horizontal alignment film (horizontally aligned) herein means that the pre-tilt angle of liquid crystal molecules is 0° to 5°, preferably 0° to 2°, more preferably 0° to 1°, with respect to the surface of the horizontal alignment film. The pre-tilt angle of a liquid crystal molecule is the angle of the major axis of the liquid crystal molecule inclining to the surface of the horizontal alignment film with no voltage applied to the liquid crystal layer 30. The alignment film 40 may have undergone alignment treatment such as rubbing treatment or photo-alignment treatment. In other words, the alignment film 40 may be an alignment film for rubbing treatment or a photo-alignment film.

<Liquid Crystal Layer>

The liquid crystal material constituting the liquid crystal layer 30 may be a positive liquid crystal material having positive anisotropy of dielectric constant or a negative liquid crystal material having negative anisotropy of dielectric constant. In a liquid crystal display device 1a of the transverse electric field mode such as the FFS mode or the IPS mode, when the surface of the retardation layer 23 has undergone rubbing treatment and the alignment film 40 is a horizontal alignment film, the alignment control force of the retardation layer 23 and the alignment film 40 horizontally aligns liquid crystal molecules in the liquid crystal layer 30 at a predetermined azimuth with no voltage applied to the liquid crystal layer 30. Meanwhile, liquid crystal molecules in the liquid crystal layer 30, with voltage applied to the liquid crystal layer 30, rotate in an in-plane direction in response to the transverse electric field generated in the liquid crystal layer 30.

The liquid crystal display device 1a may further include an antireflection film on the viewing surface side (side opposite to the color filter substrate 20) of the first linear polarizing plate 10. This suppresses the surface reflection of the liquid crystal display device 1a. The antireflection film is preferably an optical film having a surface with a moth-eye structure (structure of a moth's eye).

The liquid crystal display device 1a may further include a backlight on the back surface side (side opposite from the thin film transistor array substrate 50) of the second linear polarizing plate 60. In this case, the liquid crystal display device 1a is a transmissive liquid crystal display device.

The liquid crystal display device 1a may further include, in addition to the described members, members typically used in the field of liquid crystal display devices, e.g., external circuits such as a tape carrier package (TCP) and a print circuit board (PCB); and a bezel (frame), as appropriate.

Embodiment 2

Figure 3:
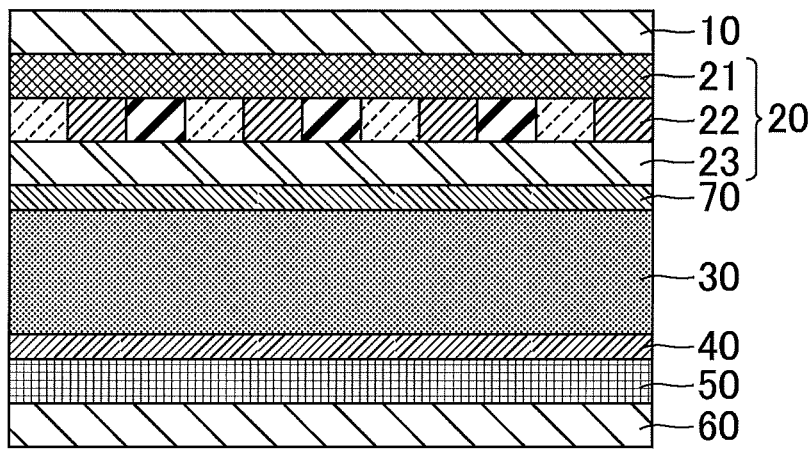
FIG. 3 is a schematic cross-sectional view of a liquid crystal display device of Embodiment 2.
Figure 4:
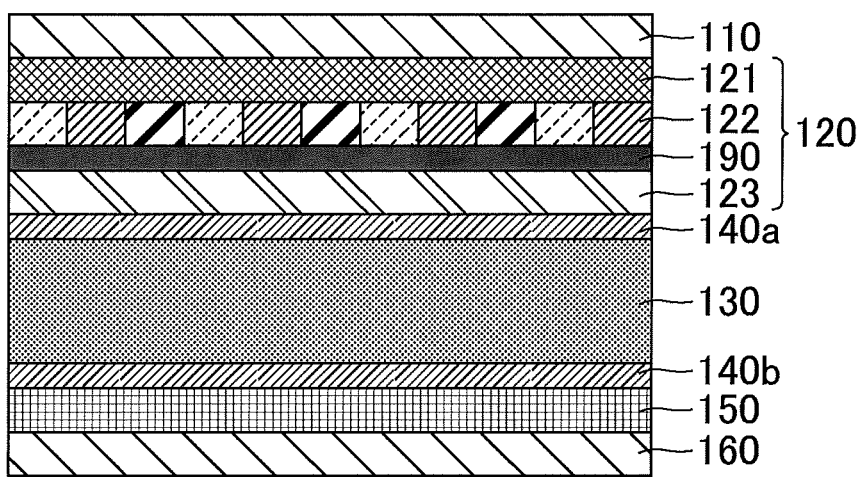
FIG. 4 is a schematic cross-sectional view of an example of a conventional liquid crystal display device in which a retardation layer is formed by a method using an alignment layer.
Figure 5A:
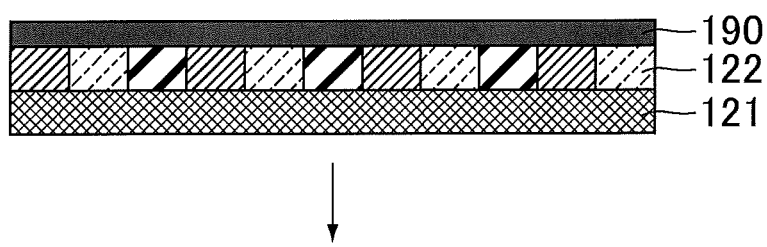
FIG. 5A, FIG. 5B, and FIG. 5C are schematic cross-sectional views for illustrating a method for forming a retardation layer using an alignment layer.
Figure 5B:
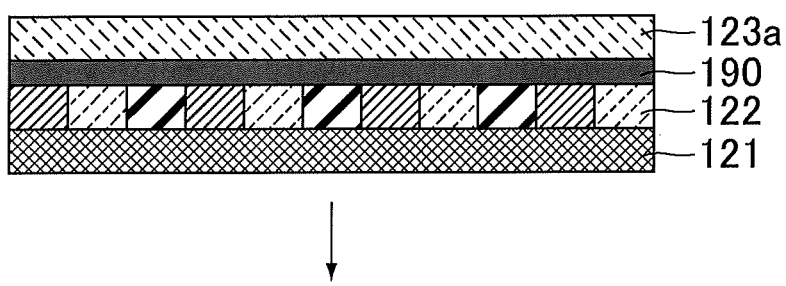
Figure 5C:
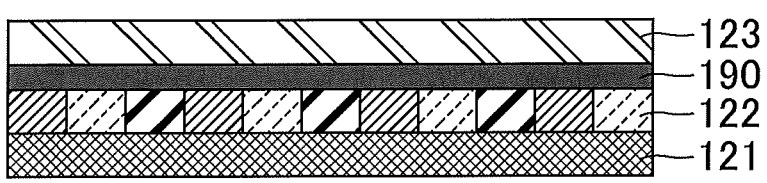

FIG. 3 is a schematic cross-sectional view of a liquid crystal display device of Embodiment 2. As shown in FIG. 3, a liquid crystal display device 1b includes, in the order from the viewing surface side to the back surface side, the first linear polarizing plate 10, the color filter substrate 20, a photo-alignment film 70, the liquid crystal layer 30, the alignment film 40, the thin film transistor array substrate 50, and the second linear polarizing plate 60. Since the members excluding the photo-alignment film 70 of the liquid crystal display device 1b are as described above, the description thereof is omitted.

<Photo-Alignment Film>

The photo-alignment film 70 contains a material with photo-alignability and can exert alignment control force to liquid crystal molecules, i.e., can control the alignment of liquid crystal molecules, in the liquid crystal layer 30 by light irradiation. In the liquid crystal display device 1b, the photo-alignment film 70 is disposed on the liquid crystal layer 30 side of the retardation layer 23. This improves the alignability of liquid crystal molecules in the liquid crystal layer 30 and thereby increases the contrast ratio of the liquid crystal display device 1b. The photo-alignment film 70 may function as a horizontal alignment film (horizontal photo-alignment film).

The expression "material with photo-alignability" herein means a general material that undergoes structural change by light irradiation such as UV light or visible light irradiation and thereby controls the alignment of (exerts alignment control force to) nearby liquid crystal molecules or changes the intensity and/or direction of the alignment control force.

Examples of the material with photo-alignability include materials with a photo-functional group (photo-reactive moiety) that causes a reaction such as photodimerization, photoisomerization, photo Fries rearrangement, or photolysis by light irradiation. Examples of a photo-functional group capable of photodimerization and photoisomerization include cinnamate, chalcone, coumarin, and stilbene groups. Examples of a photo-functional group capable of photoisomerization include an azobenzene group. Examples of a photo-functional group capable of photo Fries rearrangement include a phenol ester group. Examples of a photo-functional group capable of photolysis include a cyclobutane ring.

The photo-alignment film 70 disposed with the retardation layer 23 is preferably a photo-alignment film that contains a polymer containing a cinnamate group or a photo-alignment film that contains a polymer with a structure derived from a cyclobutane ring. In particular, a photo-alignment film 70 that contains a polymer containing a cinnamate group is compatible with the retardation layer 23 that contains a cinnamate skeleton. This suppresses reflection at the interface between the photo-alignment film 70 and the retardation layer 23 to significantly improve the visibility of display images in bright places (e.g., under natural light).

The photo-alignment film that contains a polymer containing a cinnamate group may be formed by the following method. First, an alignment film material that contains a polymer containing a cinnamate group (material with photo-alignability) is applied to the surface of the retardation layer 23 to form a polymer film that contains the polymer containing a cinnamate group. This polymer film is irradiated with polarized light (e.g., polarized UV light) to exert alignment control force to liquid crystal molecules in the liquid crystal layer 30.

The photo-alignment film that contains a polymer with a structure derived from a cyclobutane ring may be formed by the following method. First, an alignment film material that contains a polymer containing a cyclobutane ring (material with photo-alignability) is applied to the surface of the retardation layer 23 to form a polymer film that contains the polymer containing a cyclobutane ring. This polymer film is irradiated with polarized light (e.g., polarized UV light) to exert alignment control force to liquid crystal molecules in the liquid crystal layer 30.

Although the retardation layer 23 is disposed only in the color filter substrate 20 in Embodiments 1 and 2, the retardation layer 23 may be disposed only in the thin film transistor array substrate 50 or in both of the color filter substrate 20 and the thin film transistor array substrate 50.

EXAMPLES AND COMPARATIVE EXAMPLES

The present invention is described below in more detail based on examples and comparative examples. The examples, however, are not intended to limit the scope of the present invention. In the following description regarding formation of a retardation layer, a laminate including a support substrate and a color filter/black matrix may also be referred to as a color filter substrate for convenience.

Example 1

A liquid crystal display device of Embodiment 1 as a liquid crystal display device of Example 1 was produced by the following method.

First, a monomer material for a retardation layer was prepared by dissolving 10 wt % of a photo-alignment monomer M1 represented by the following formula (3-1) in propylene glycol monomethyl ether acetate as a solvent.

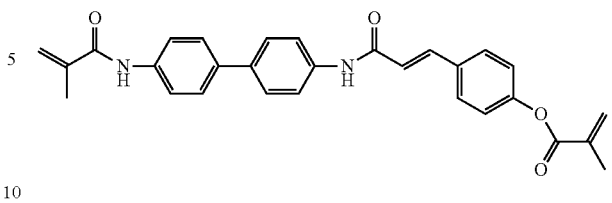

(3-1)

The monomer material for a retardation layer was applied to a surface of a color filter substrate (color filter/black matrix) with a spin coater to form a film containing the photo-alignment monomer M1.

The color filter substrate with the film containing the photo-alignment monomer M1 was placed on a hot plate at 140° C. for one minute to be pre-baked. The film containing the photo-alignment monomer M1 was then irradiated with polarized UV light (central wavelength: 365 nm, irradiation dose: 5 J/cm$^2$), whereby molecules of the photo-alignment monomer M1 were aligned and polymerized. Subsequently, post-baking was performed at 180° C. for 30 minutes to complete the polymerization of the photo-alignment monomer M1 and perfectly remove the solvent. As a result, the film containing the photo-alignment monomer M1 was completely cured into a retardation layer. The retardation layer had a thickness of 1 μm and a retardation of 135 nm.

Next, a thin film transistor array substrate for the FFS mode including pixel electrodes and a common electrode and a color filter substrate including the retardation layer and no electrode were prepared. Then, a material for a polyimide alignment film for rubbing treatment was applied to a surface of the thin film transistor array substrate to form a film, and the surface of the film was subjected to rubbing treatment. As a result, an alignment film for rubbing treatment was formed on the surface of the thin film transistor array substrate. Meanwhile, the surface of the retardation layer of the color filter substrate was subjected to rubbing treatment such that the rubbing direction was antiparallel to the rubbing direction for the alignment film for rubbing treatment on the thin film transistor array substrate side (antiparallel alignment). The rubbing treatment to the retardation layer was performed in the 45° direction with respect to the in-plane slow axis of the retardation layer.

Next, a seal material was applied in a pattern to the surface of the thin film transistor array substrate. The seal material used was a UV light/heat curable seal material that is cured by both UV light and heat. Subsequently, a positive liquid crystal material (nematic-isotropic phase transition temperature: 90° C.) was dropped on the surface of the thin film transistor array substrate (in the region surrounded by the seal material), and the substrate was bonded with the color filter substrate including the retardation layer. Thereby, a liquid crystal layer was formed in the region surrounded by the seal material in a plan view. Then, the temperature of the liquid crystal layer was controlled at 100° C. (a temperature not lower than the nematic-isotropic phase transition temperature of the liquid crystal material), whereby realignment treatment was performed. As a result, the liquid crystal display device of Example 1 that included a retardation layer (FFS mode liquid crystal display device) was completed.

Example 2

A liquid crystal display device of Example 2 was produced in the same manner as with the liquid crystal display device of Example 1 except that a photo-alignment monomer M2 represented by the following formula (3-2) was used in place of the photo-alignment monomer M1.

(3-2)

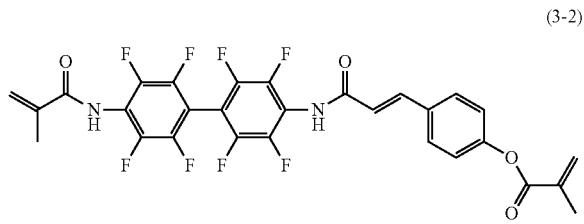 [SMILES: C=C(C)C(=O)Nc1c(F)c(F)c(-c2c(F)c(F)c(NC(=O)/C=C/c3ccc(OC(=O)C(=C)C)cc3)c(F)c2F)c(F)c1F]

Example 3

A liquid crystal display device of Example 3 was produced in the same manner as with the liquid crystal display device of Example 1 except that a photo-alignment monomer M3 represented by the following formula (3-3-1) was used in place of the photo-alignment monomer M1.

(3-3-1)

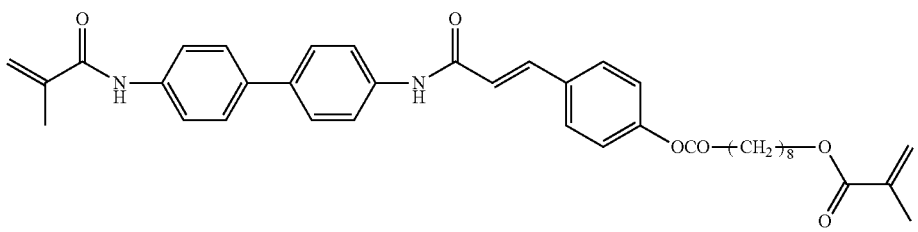

Comparative Example 1

A liquid crystal display device of Comparative Example 1 was produced by the following method.

First, a monomer material for a retardation layer was prepared by dissolving 10 wt % of a photo-alignment monomer N1 represented by the following formula (4) in propylene glycol monomethyl ether acetate as a solvent.

(4)

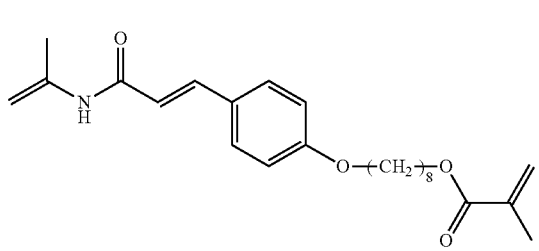

The monomer material for a retardation layer was applied to a surface of a color filter substrate (color filter/black matrix) with a spin coater to form a film containing the photo-alignment monomer N1.

The color filter substrate with the film containing the photo-alignment monomer N1 was placed on a hot plate at 140° C. for one minute to be pre-baked. The film containing the photo-alignment monomer N1 was then irradiated with unpolarized UV light (central wavelength: 365 nm, irradiation dose: 5 J/cm$^2$), whereby molecules of the photo-alignment monomer N1 were aligned and polymerized. Subsequently, post-baking was performed at 180° C. for 30 minutes to complete the polymerization of the photo-alignment monomer N1 and perfectly remove the solvent. As a result, the film containing the photo-alignment monomer N1 was completely cured into a retardation layer. The retardation layer had a thickness of 1 μm and a retardation of 135 nm.

Then, the same processes as for the liquid crystal display device of Example 1 were taken except for using the color filter substrate including the retardation layer obtained by the described method, whereby the liquid crystal display device of Comparative Example 1 was produced.

Comparative Example 2

A liquid crystal display device of Comparative Example 2 was produced in the same manner as with the liquid crystal display device of Comparative Example 1 except that the retardation layer was not formed on the color filter substrate.

Evaluation 1

The liquid crystal display devices of Examples 1 to 3 and Comparative Examples 1 and 2 were evaluated on the following properties. Table 1 shows the results.

(Thermal Stability of Retardation Layer)

The retardation of the retardation layer was determined by the ellipsometry technique before and after the baking performed by placing the liquid crystal display device on a hot plate at 200° C. for 30 minutes.

(Contrast Ratio)

The contrast ratio of the liquid crystal display device was measured in a dark room using a luminance meter "Topcon BM5" available from Topcon Technohouse Corporation.

(Outdoor Visibility)

The display region in the display state of the liquid crystal display device was equivalently divided into nine regions (the regions may be arranged in a longitudinal or lateral direction) consisting of "a region providing 0 gray-scale display", "a region providing 32 gray-scale display", "a region providing 64 gray-scale display", "a region providing 96 gray-scale display", "a region providing 128 gray-scale display", "a region providing 160 gray-scale display", "a region providing 192 gray-scale display", "a region providing 224 gray-scale display", and "a region providing 255 gray-scale display". The display region was observed outdoors under sunlight, and whether the differences between the gray-scale displays were recognized or not was determined. The evaluation criteria were as follows.

Good: The differences between the gray-scale displays were recognized.

Poor: No difference between the gray-scale displays was recognized.

TABLE 1

| | Retardation of retardation layer (nm) | | Contrast ratio | Outdoor visibility |
|---|---|---|---|---|
| | Before baking | After baking | | |
| Example 1 | 135 | 127 | 585 | Good |
| Example 2 | 135 | 133 | 580 | Good |
| Example 3 | 135 | 130 | 560 | Good |
| Comparative Example 1 | 135 | 102 | 480 | Good |
| Comparative Example 2 | — | — | 750 | Poor |

In Examples 1 to 3, the decrease in retardation of the retardation layer from before to after the baking was small, i.e., the thermal stability of the retardation layer was excellent. The photo-alignment monomers M1, M2, and M3 used in Examples 1, 2, and 3, respectively, each included a biphenyl group with liquid crystallinity in addition to a cinnamate group functioning as a photo-functional group and capable of self-alignment. This achieved uniform alignment in the entire retardation layer (particularly, in the thickness direction), which presumably suppressed the decrease in retardation caused by heat. Furthermore, the photo-alignment monomers M1, M2, and M3 each contained an amino group and an amide group. This caused a large amount of intermolecular hydrogen bonding, which presumably more improved the thermal stability of the retardation layer. In particular, in Example 2 where the photo-alignment monomer M2 was used in which hydrogen atoms in the biphenyl group were replaced by fluorine atoms, the thermal stability of the retardation layer was more improved than in Examples 1 and 3 and the decrease in retardation of the retardation layer from before to after the baking was extremely small.

In Examples 1 to 3, the decrease in contrast ratio caused by scattering on the retardation layer was suppressed and the outdoor visibility was good.

In Comparative Example 1, the decrease in retardation of the retardation layer from before to after the baking was large, i.e., the thermal stability of the retardation layer was poor. The photo-alignment monomer N1 used in Comparative Example 1, which contained a cinnamate group but no biphenyl group, failed in achieving stable alignability and thereby presumably failed in providing a retardation layer excellent in thermal stability.

In Comparative Example 2 where no retardation layer was provided, the outdoor visibility was poor.

Example 4

A liquid crystal display device of Embodiment 2 as a liquid crystal display device of Example 4 was produced by the following method.

First, a monomer material for a retardation layer was prepared by dissolving 10 wt % of a photo-alignment monomer M4 represented by the following formula (3-4-1) in propylene glycol monomethyl ether acetate as a solvent.

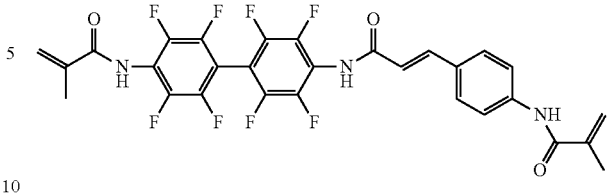

(3-4-1)

The monomer material for a retardation layer was applied to a surface of a color filter substrate (color filter/black matrix) with a spin coater to form a film containing the photo-alignment monomer M4.

The color filter substrate with the film containing the photo-alignment monomer M4 was placed on a hot plate at 140° C. for one minute to be pre-baked. The film containing the photo-alignment monomer M4 was then irradiated with polarized UV light (central wavelength: 365 nm, irradiation dose: 5 J/cm$^2$), whereby molecules of the photo-alignment monomer M4 were aligned and polymerized. Subsequently, post-baking was performed at 180° C. for 30 minutes to complete the polymerization of the photo-alignment monomer M4 and perfectly remove the solvent. As a result, the film containing the photo-alignment monomer M4 was completely cured into a retardation layer. The retardation layer had a thickness of 1 μm and a retardation of 135 nm.

Next, a thin film transistor array substrate for the FFS mode including pixel electrodes and a common electrode and a color filter substrate including the retardation layer and no electrode were prepared. On a surface of each substrate, a polymer film that contained a polymer containing a cinnamate group represented by the following formula (5) was formed. Subsequently, the polymer films on the respective substrates were subjected to photo-alignment treatment to have alignments antiparallel to each other (antiparallel alignment). Thereby, a photo-alignment film that contained a polymer containing a cinnamate group was formed on the surface of each substrate. The photo-alignment treatment to each polymer film was performed by irradiation with polarized UV light with a wavelength of 280 to 330 nm using a cut filter. The photo-alignment treatment to the polymer film on the color filter substrate side was performed in the 45° direction with respect to the in-plane slow axis of the retardation layer.

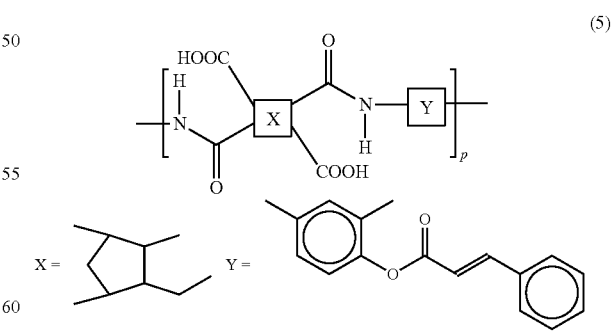

(5)

In the formula (5), p represents a polymerization degree.

Next, a seal material was applied in a pattern to the surface of the thin film transistor array substrate. The seal material used was a UV light/heat curable seal material that is cured by either of UV light or heat.

Subsequently, a positive liquid crystal material (nematic-isotropic phase transition temperature: 90° C.) was dropped on the surface of the thin film transistor array substrate (in the region surrounded by the seal material), and the substrate was bonded with the color filter substrate including the retardation layer. Thereby, a liquid crystal layer was formed in the region surrounded by the seal material in a plan view. Then, the temperature of the liquid crystal layer was controlled at 100° C. (a temperature not lower than the nematic-isotropic phase transition temperature of the liquid crystal material), whereby realignment treatment was performed. As a result, the liquid crystal display device of Example 4 that included a retardation layer (FFS mode liquid crystal display device) was completed.

Example 5

A liquid crystal display device of Example 5 was produced in the same manner as with the liquid crystal display device of Example 4 except that a polyimide alignment film for rubbing treatment was used in place of the photo-alignment film.

Comparative Example 3

A liquid crystal display device of Comparative Example 3 was produced in the same manner as with the liquid crystal display device of Example 4 except that the retardation layer was not formed on the color filter substrate.

Evaluation 2

The liquid crystal display devices of Examples 4 and 5 and Comparative Example 3 were evaluated in the same manner as in Evaluation 1. Table 2 shows the results.

TABLE 2

| | Retardation of retardation layer (nm) | | Contrast ratio | Outdoor visibility |
|---|---|---|---|---|
| | Before baking | After baking | | |
| Example 4 | 135 | 134 | 633 | Good |
| Example 5 | 135 | 134 | 500 | Good |
| Comparative Example 3 | — | — | 900 | Poor |

In Examples 4 and 5, the decrease in retardation of the retardation layer from before to after the baking was extremely small, i.e., the thermal stability of the retardation layer was excellent. The photo-alignment monomer M4 used in Examples 4 and 5 included a biphenyl group with liquid crystallinity in addition to a cinnamate group functioning as a photo-functional group and capable of self-alignment. This achieved uniform alignment in the entire retardation layer (particularly, in the thickness direction), which presumably suppressed the decrease in retardation caused by heat. In addition, the photo-alignment monomer M4, which contained an amino group and an amide group, caused a large amount of intermolecular hydrogen bonding, which presumably more improved the thermal stability of the retardation layer. Furthermore, in the photo-alignment monomer M4, hydrogen atoms in the biphenyl group were replaced by fluorine atoms, which presumably improved the thermal stability of the retardation layer.

In Examples 4 and 5, the decrease in contrast ratio caused by scattering on the retardation layer was suppressed and the outdoor visibility was good. In particular, in Example 4 using a photo-alignment film, the contrast ratio and the outdoor visibility were both better than in Example 5 using an alignment film for rubbing treatment. The better contrast ratio in Example 4 was presumably achieved by suppression of scattering on the retardation layer, and combination use of a retardation layer and a photo-alignment film that contains a polymer containing a cinnamate group, which suppressed reflection at the interface between the photo-alignment film and the retardation layer.

In Comparative Example 3 where no retardation layer was provided, the outdoor visibility was poor.

Example 6

A liquid crystal display device of Embodiment 2 as a liquid crystal display device of Example 6 was produced by the following method.

First, a monomer material for a retardation layer was prepared by dissolving 10 wt % of a photo-alignment monomer M5 represented by the following formula (3-5-1) in propylene glycol monomethyl ether acetate as a solvent.

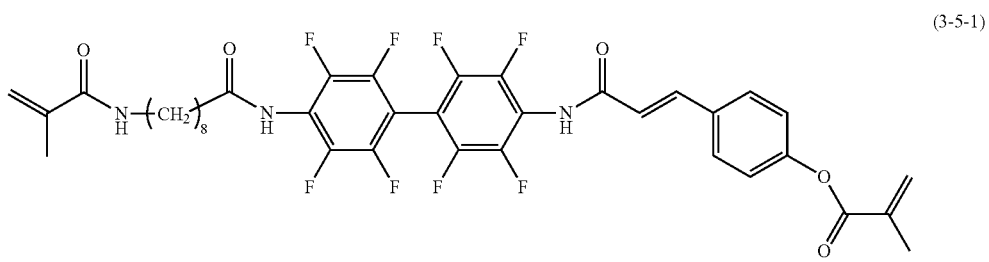

(3-5-1)

The monomer material for a retardation layer was applied to a surface of a color filter substrate (color filter/black matrix) with a spin coater to form a film containing the photo-alignment monomer M5.

The color filter substrate with the film containing the photo-alignment monomer M5 was placed on a hot plate at 140° C. for one minute to be pre-baked. The film containing the photo-alignment monomer M5 was then irradiated with polarized UV light (central wavelength: 365 nm, irradiation dose: 5 J/cm$^2$), whereby molecules of the photo-alignment monomer M5 were aligned and polymerized. Subsequently, post-baking was performed at 180° C. for 30 minutes to complete the polymerization of the photo-alignment monomer M5 and perfectly remove the solvent. As a result, the film containing the photo-alignment monomer M5 was completely cured into a retardation layer. The retardation layer had a thickness of 1 μm and a retardation of 135 nm.

Next, a thin film transistor array substrate for the FFS mode including pixel electrodes and a common electrode and a color filter substrate including the retardation layer and no electrode were prepared. Then, on a surface of each substrate, a polymer film that contained a polymer containing a cyclobutane ring represented by the following formula (6) was formed. Subsequently, the polymer films on the respective substrates were subjected to photo-alignment treatment to have alignments antiparallel to each other (antiparallel alignment). Thereby, a photo-alignment film that contained a polymer with a structure derived from a cyclobutane ring was formed on the surface of each substrate. The photo-alignment treatment to each polymer film was performed by irradiation with polarized UV light with a wavelength not longer than 300 nm using a cut filter. The photo-alignment treatment to the polymer film on the color filter substrate side was performed in the 45° direction with respect to the in-plane slow axis of the retardation layer.

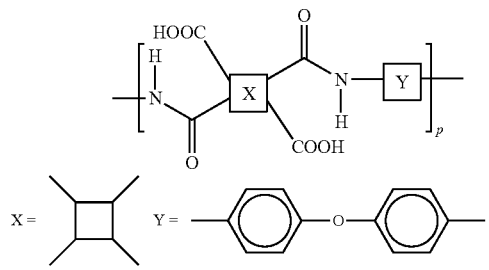

(6)

In the formula (6), p represents a polymerization degree.

Next, a seal material was applied in a pattern to the surface of the thin film transistor array substrate. The seal material used was a UV light/heat curable seal material that is cured by either of UV light or heat. Subsequently, a negative liquid crystal material (nematic-isotropic phase transition temperature: 80° C.) was dropped on the surface of the thin film transistor array substrate (in the region surrounded by the seal material), and the substrate was bonded with the color filter substrate including the retardation layer. Thereby, a liquid crystal layer was formed in the region surrounded by the seal material in a plan view. Then, the temperature of the liquid crystal layer was controlled at 100° C. (a temperature not lower than the nematic-isotropic phase transition temperature of the liquid crystal material), whereby realignment treatment was performed. As a result, the liquid crystal display device of Example 6 that included a retardation layer (FFS mode liquid crystal display device) was completed.

Comparative Example 4

A liquid crystal display device of Comparative Example 4 was produced in the same manner as with the liquid crystal display device of Example 6 except that the retardation layer was not formed on the color filter substrate.

Evaluation 3

The liquid crystal display devices of Example 6 and Comparative Example 4 were evaluated in the same manner as in Evaluation 1. Table 3 shows the results.

TABLE 3

| | Retardation of retardation layer (nm) | | Contrast ratio | Outdoor visibility |
|---|---|---|---|---|
| | Before baking | After baking | | |
| Example 6 | 135 | 133 | 661 | Good |
| Comparative Example 4 | — | — | 1000 | Poor |

In Example 6, the decrease in retardation of the retardation layer from before to after the baking was extremely small, i.e., the thermal stability of the retardation layer was excellent. The photo-alignment monomer M5 used in Example 6 included a biphenyl group with liquid crystallinity in addition to a cinnamate group functioning as a photo-functional group and capable of self-alignment. This achieved uniform alignment in the entire retardation layer (particularly, in the thickness direction), which presumably suppressed the decrease in retardation caused by heat. In addition, the photo-alignment monomer M5, which contained an amino group and an amide group, caused a large amount of intermolecular hydrogen bonding, which presumably improved the thermal stability of the retardation layer. Furthermore, in the photo-alignment monomer M5, hydrogen atoms in the biphenyl group were replaced by fluorine atoms, which presumably improved the thermal stability of the retardation layer.

In Example 6, the decrease in contrast ratio caused by scattering on the retardation layer was suppressed and the outdoor visibility was good. The better contrast ratio in Example 6 was presumably achieved by suppression of scattering on the retardation layer, use of a photo-alignment film, and use of a negative liquid crystal material, which improved the transmittance.

In Comparative Example 4 where no retardation layer was provided, the outdoor visibility was poor.

[Additional Remarks]

A first aspect of the present invention may be a liquid crystal display device including: a pair of substrates, and a liquid crystal layer held between the substrates, at least one of the substrates including a retardation layer that contains a polymer of at least one type of monomer, the at least one type of monomer including a photo-alignment monomer represented by the following formula (1). This aspect achieves a liquid crystal display device that includes the retardation layer with excellent thermal stability and suppresses a decrease in contrast ratio caused by scattering.

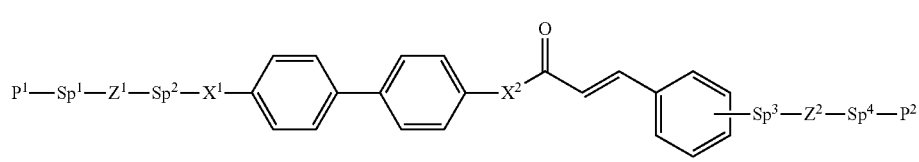

(1)

In the formula (1), $P^1$ and $P^2$ are the same as or different from each other and each represent an acrylic group or a methacrylic group; $Sp^1$, $Sp^2$, $Sp^3$, and $Sp^4$ are the same as or different from each other and each represent —O—, —S—, —NH—, —COO—, —COO—, —NHCO—, —CONH—, —NHCS—, —CSNH—, or a direct bond; $Z^1$ and $Z^2$ are the same as or different from each other and each represent a C1-C12 linear, branched, or cyclic alkylene group, or a direct bond; $X^1$ and $X^2$ are the same as or different from each other and each represent —NH— or —O—; and any hydrogen atom in the biphenyl group may be replaced by a fluorine atom.

In the first aspect of the present invention, the photo-alignment monomer may be represented by the following formula (2-1), (2-2), (2-3), (2-4), (2-5), (2-6), or (2-7). Specifically, the photo-alignment monomer may be represented by the following formula (3-1), (3-2), (3-3), (3-4), (3-5), (3-6), or (3-7). This allows the photo-alignment monomer to effectively function in the retardation layer.

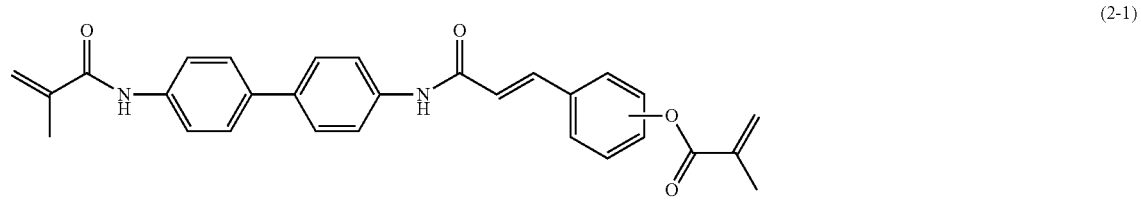

(2-1)

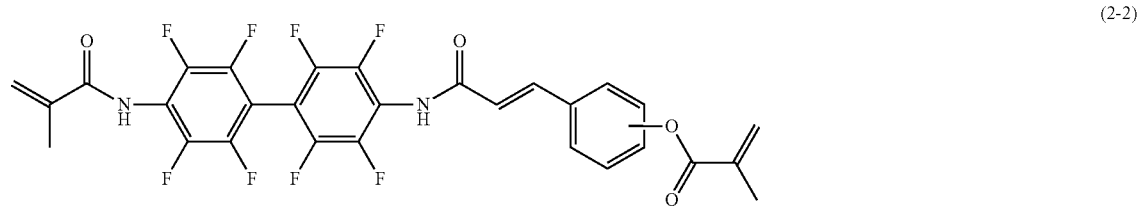

(2-2)

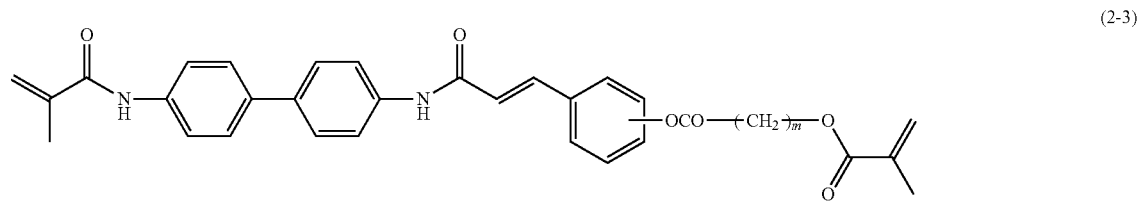

(2-3)

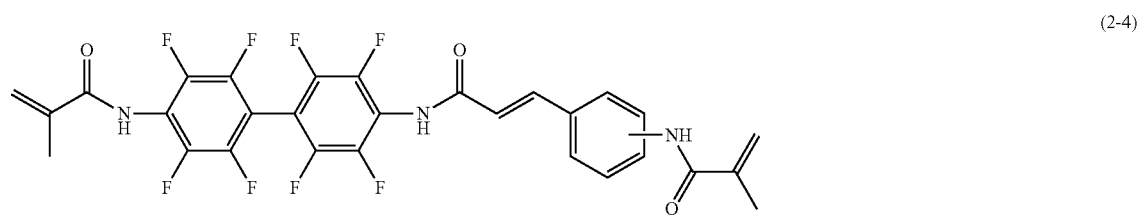

(2-4)

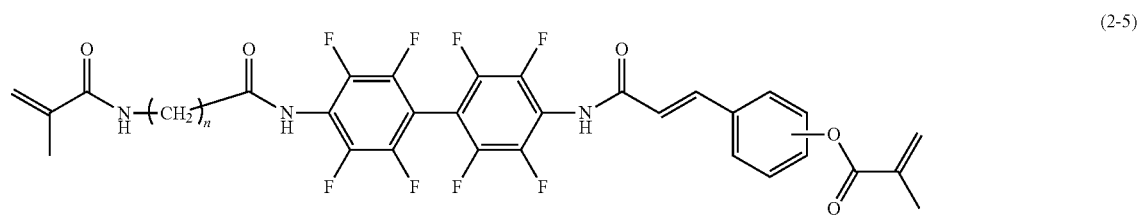

(2-5)

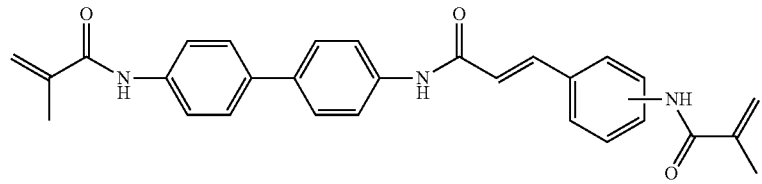
(2-6)
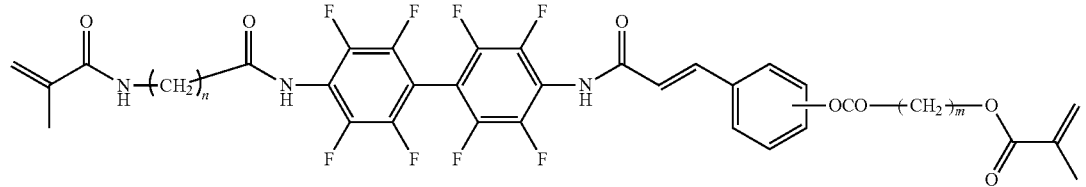
(2-7)
Any methacrylic group in the formulas (2-1), (2-2), (2-3), (2-4), (2-5), (2-6), and (2-7) may be replaced by an acrylic group, and m and n in the formulas (2-3), (2-5), and (2-7) are the same as or different from each other and each represent an integer of 1 to 12.
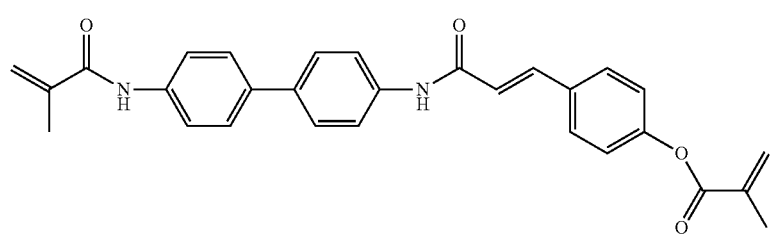
(3-1)
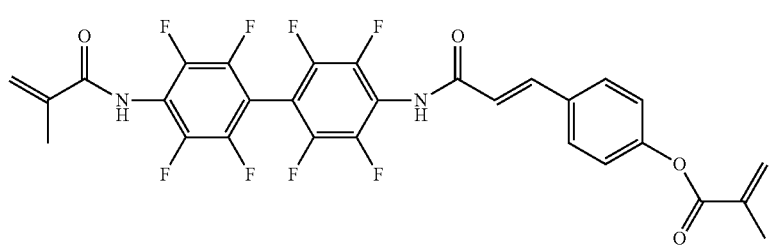
(3-2)
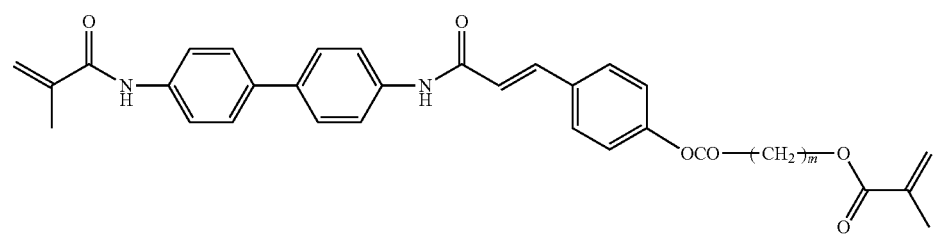
(3-3)
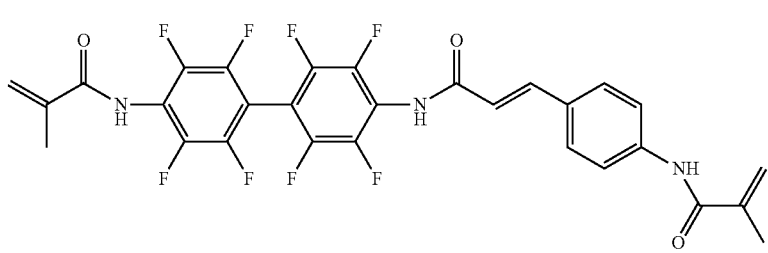
(3-4)

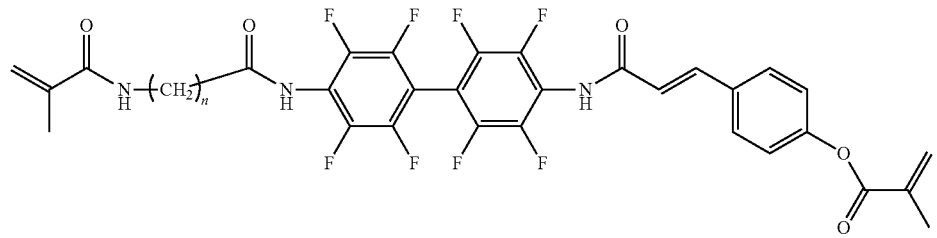

(3-5)

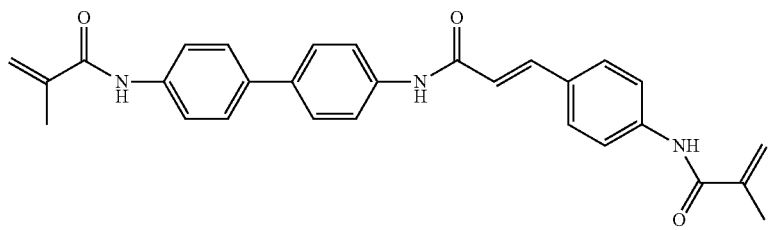

(3-6)

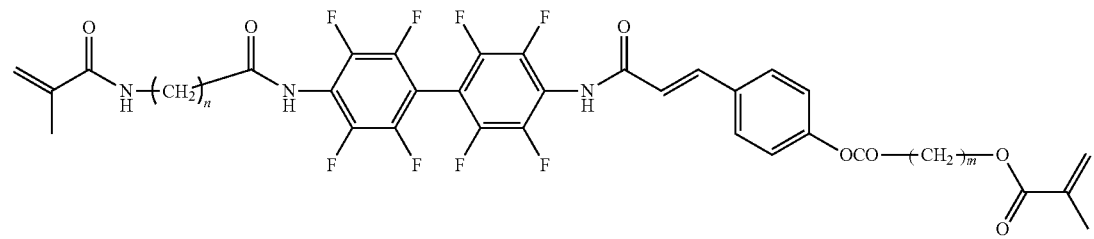

(3-7)

Any methacrylic group in the formulas (3-1), (3-2), (3-3), (3-4), (3-5), (3-6), and (3-7) may be replaced by an acrylic group, and m and n in the formulas (3-3), (3-5), and (3-7) are the same as or different from each other and each represent an integer of 1 to 12.

In the first aspect of the present invention, the liquid crystal display device may further include, between at least one of the substrates and the liquid crystal layer, an alignment film that controls alignment of liquid crystal molecules in the liquid crystal layer. The alignment film may be a horizontal alignment film that aligns the liquid crystal molecules in the liquid crystal layer in a direction parallel to a surface of the alignment film. This allows liquid crystal molecules in the liquid crystal layer to horizontally align at a predetermined azimuth.

In the first aspect of the present invention, the alignment film may be a photo-alignment film. The photo-alignment film may contain a polymer containing a cinnamate group or a polymer with a structure derived from a cyclobutane ring. This improves the alignability of liquid crystal molecules in the liquid crystal layer, leading to an increase in contrast ratio of the liquid crystal display device. In particular, when the photo-alignment film contains a polymer containing a cinnamate group, the photo-alignment film is compatible with the retardation layer that contains a cinnamate skeleton. This suppresses reflection at the interface between the photo-alignment film and the retardation layer to significantly improve the visibility of display images in bright places (e.g., under natural light).

A second aspect of the present invention may be a method for producing a liquid crystal display device that includes a liquid crystal layer and a substrate with a retardation layer, the method including: forming a film that contains at least one type of monomer including a photo-alignment monomer represented by the following formula (1), and irradiating the film with polarized light to align and polymerize molecules of the photo-alignment monomer and thereby forming the retardation layer. This aspect achieves a method for producing a liquid crystal display device that includes the retardation layer with excellent thermal stability and suppresses a decrease in contrast ratio caused by scattering.

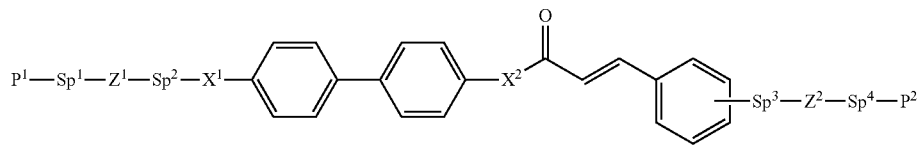

(1)

In the formula (1), $P^1$ and $P^2$ are the same as or different from each other and each represent an acrylic group or a methacrylic group; $Sp^1$, $Sp^2$, $Sp^3$, and $Sp^4$ are the same as or different from each other and each represent —O—, —S—, —NH—, —COO—, —COO—, —NHCO—, —CONH—, —NHCS—, —CSNH—, or a direct bond; $Z^1$ and $Z^2$ are the same as or different from each other and each represent a C1-C12 linear, branched, or cyclic alkylene group, or a direct bond; $X^1$ and $X^2$ are the same as or different from each other and each represent —NH— or —O—; and any hydrogen atom in the biphenyl group may be replaced by a fluorine atom.

In the second aspect of the present invention, the method may further include subjecting a surface of the retardation layer to rubbing treatment and thereby causing the retardation layer to exhibit alignment control force to liquid crystal molecules in the liquid crystal layer. This can prevent a decrease in retardation caused by disordered alignment of the photo-alignment monomer molecules to cause alignment of liquid crystal molecules in the liquid crystal layer.

In the second aspect of the present invention, the method may further include forming on a surface of the retardation layer a polymer film that contains a polymer containing a cinnamate group, and irradiating the polymer film with polarized light and thereby causing the polymer film to exhibit alignment control force to liquid crystal molecules in the liquid crystal layer. This allows formation of a photo-alignment film that contains a polymer containing a cinnamate group on the liquid crystal layer side of the retardation layer to improve the alignability of liquid crystal molecules in the liquid crystal layer, leading to an increase in contrast ratio of the liquid crystal display device. In addition, reflection at the interface between the photo-alignment film and the retardation layer is suppressed, which significantly improves the visibility of display images in bright places (e.g., under natural light).

In the second aspect of the present invention, the method may further include forming on a surface of the retardation layer a polymer film that contains a polymer containing a cyclobutane ring, and irradiating the polymer film with polarized light and thereby causing the polymer film to exhibit alignment control force to liquid crystal molecules in the liquid crystal layer. This allows formation of a photo-alignment film that contains a polymer with a structure derived from a cyclobutane ring on the liquid crystal layer side of the retardation layer to improve the alignability of liquid crystal molecules in the liquid crystal layer, leading to an increase in contrast ratio of the liquid crystal display device.

A third aspect of the present invention may be a monomer material for a retardation layer, containing at least one type of monomer including a photo-alignment monomer represented by the following formula (1). This aspect achieves a monomer material for a retardation layer suitable for formation of a retardation layer excellent in thermal stability.

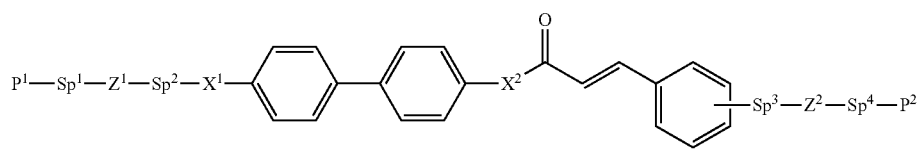

(1)

In the formula (1), $P^1$ and $P^2$ are the same as or different from each other and each represent an acrylic group or a methacrylic group; $Sp^1$, $Sp^2$, $Sp^3$, and $Sp^4$ are the same as or different from each other and each represent —O—, —S—, —NH—, —COO—, —COO—, —NHCO—, —CONH—, —NHCS—, —CSNH—, or a direct bond; $Z^1$ and $Z^2$ are the same as or different from each other and each represent a C1-C12 linear, branched, or cyclic alkylene group, or a direct bond; $X^1$ and $X^2$ are the same as or different from each other and each represent —NH— or —O—; and any hydrogen atom in the biphenyl group may be replaced by a fluorine atom.

What is claimed is:
1. A liquid crystal display device comprising:
   a pair of substrates, and
   a liquid crystal layer held between the substrates,
   at least one of the substrates including a retardation layer that contains a polymer of at least one type of monomer,
   the at least one type of monomer including a photo-alignment monomer represented by the following formula (1):

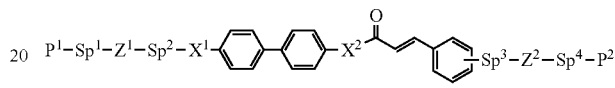

(1)

wherein $P^1$ and $P^2$ are the same as or different from each other and each represent an acrylic group or a methacrylic group; $Sp^1$, $Sp^2$, $Sp^3$, and $Sp^4$ are the same as or different from each other and each represent —O—, —S—, —NH—, —COO—, —OCO—, —NHCO—, —CONH—, —NHCS—, —CSNH—, or a direct bond; $Z^1$ and $Z^2$ are the same as or different from each other and each represent a C1-C12 linear, branched, or cyclic alkylene group, or a direct bond; $X^1$ and $X^2$ are the same as or different from each other and each represent —NH— or —O—; and any hydrogen atom in the biphenyl group may be replaced by a fluorine atom;
wherein the photo-alignment monomer is represented by the following formula (2-1), (2-2), (2-3), (2-4), (2-5), (2-6), or (2-7):

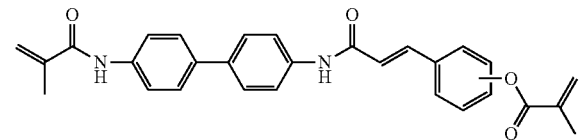

(2-1)

-continued

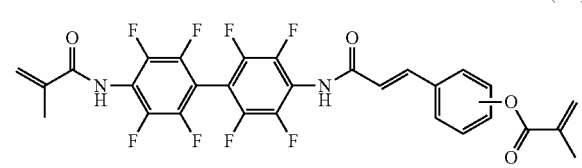

(2-2)

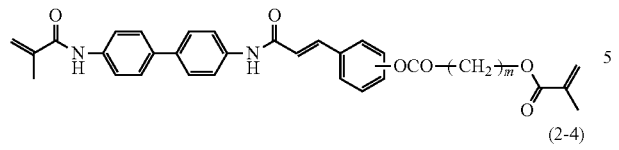
(2-3)
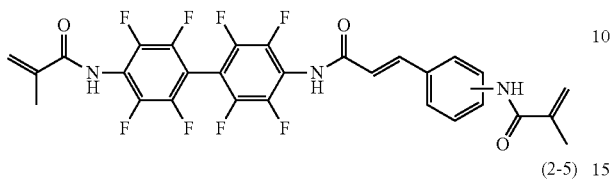
(2-4)
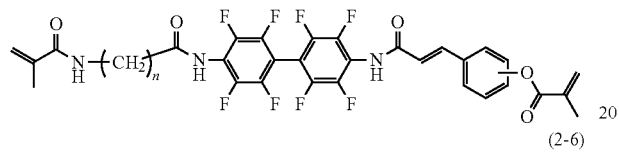
(2-5)
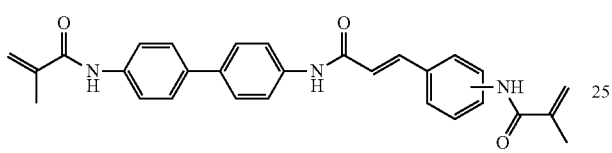
(2-6)
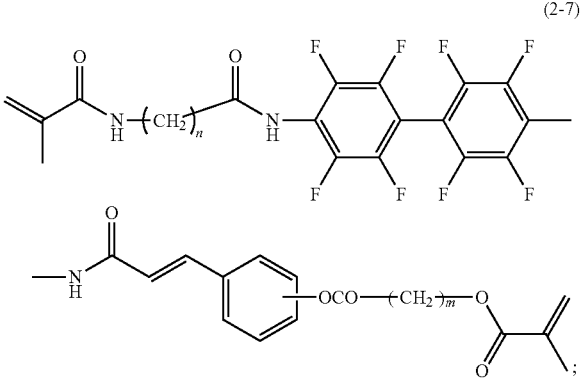
(2-7)
and
wherein any methacrylic group in the formulas (2-1), (2-2), (2-3), (2-4), (2-5), (2-6), and (2-7) may be replaced by an acrylic group, and m and n in the formulas (2-3), (2-5), and (2-7) are the same as or different from each other and each represent an integer of 1 to 12.
2. The liquid crystal display device according to claim 1, wherein the photo-alignment monomer is represented by the following formula (3-1), (3-2), (3-3), (3-4), (3-5), (3-6), or (3-7):
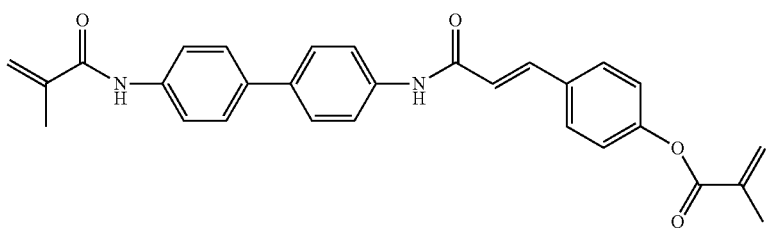
(3-1)
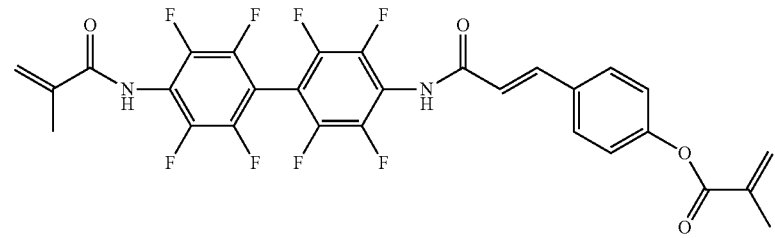
(3-2)
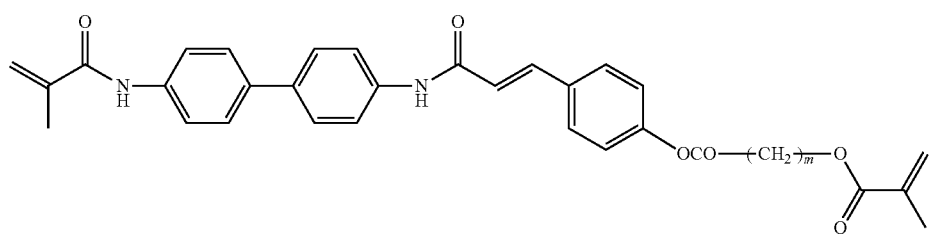
(3-3)

-continued

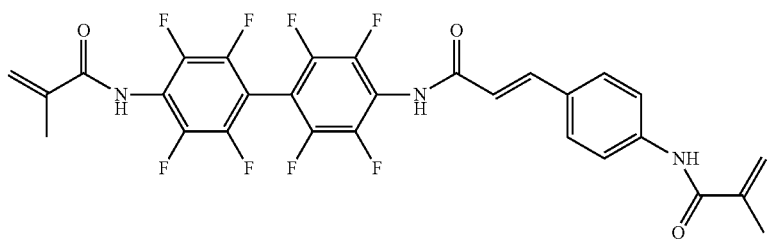
(3-4)

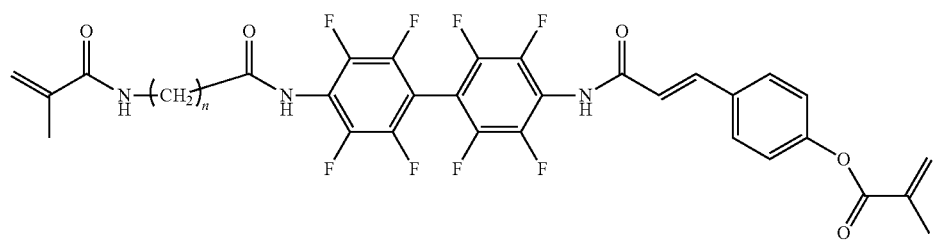
(3-5)

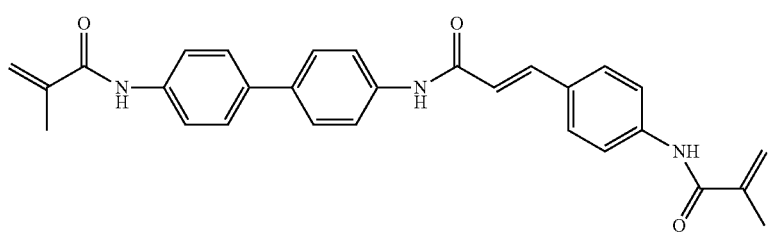
(3-6)

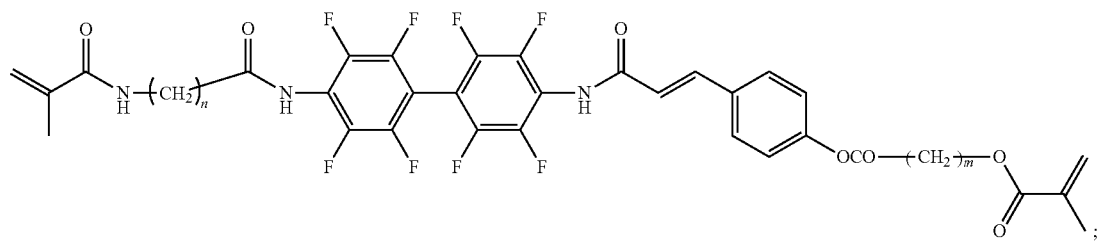
(3-7)

and wherein, any methacrylic group in the formulas (3-1), (3-2), (3-3), (3-4), (3-5), (3-6), and (3-7) may be replaced by an acrylic group, and m and n in the formulas (3-3), (3-5), and (3-7) are the same as or different from each other and each represent an integer of 1 to 12.

3. The liquid crystal display device according to claim 1, wherein the liquid crystal display device further includes, between at least one of the substrates and the liquid crystal layer, an alignment film that controls alignment of liquid crystal molecules in the liquid crystal layer.

4. The liquid crystal display device according to claim 3, wherein the alignment film is a horizontal alignment film that aligns the liquid crystal molecules in the liquid crystal layer in a direction parallel to a surface of the alignment film.

5. The liquid crystal display device according to claim 3, wherein the alignment film is a photo-alignment film.

6. The liquid crystal display device according to claim 5, wherein the photo-alignment film contains a polymer containing a cinnamate group.

7. The liquid crystal display device according to claim 5, wherein the photo-alignment film contains a polymer with a structure derived from a cyclobutane ring.

8. A monomer material for a retardation layer, comprising at least one type of monomer including a photo-alignment monomer represented by the following formula (1):

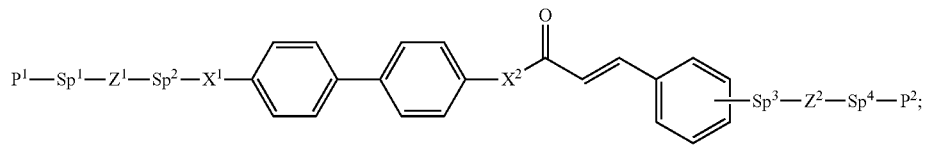
(1)

wherein P¹ and P² are the same as or different from each other and each represent an acrylic group or a methacrylic group; Sp¹, Sp², Sp³, and Sp⁴ are the same as or different from each other and each represent —O—, —S—, —NH—, —COO—, —OCO—, —NHCO—, —CONH—, —NHCS—, —CSNH—, or a direct bond; Z¹ and Z² are the same as or different from each other and each represent a C1-C12 linear, branched, or cyclic alkylene group, or a direct bond; X¹ and X² are the same as or different from each other and each represent —NH— or —O—; and any hydrogen atom in the biphenyl group may be replaced by a fluorine atom;

wherein the photo-alignment monomer is represented by the following formula (2-1), (2-2), (2-3), (2-4), (2-5), (2-6), or (2-7):

(2-1)
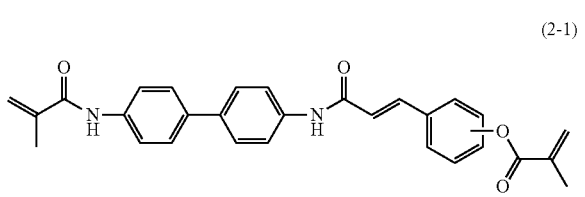

(2-2)
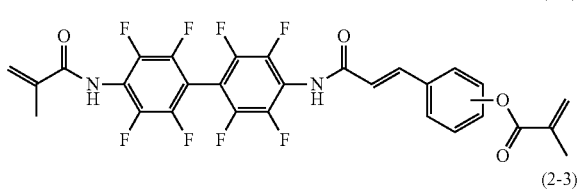

(2-3)
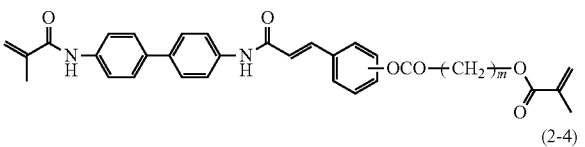

(2-4)
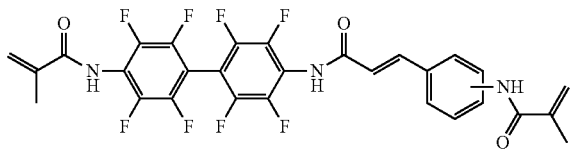

(2-5)
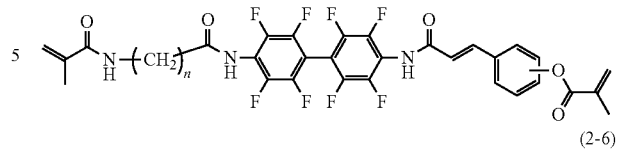

(2-6)
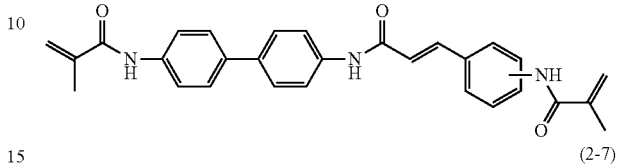

(2-7)
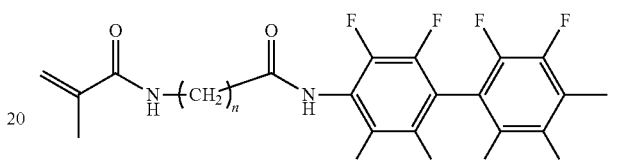

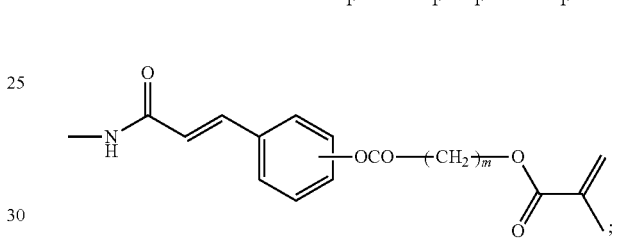

and wherein any methacrylic group in the formulas (2-1), (2-2), (2-3), (2-4), (2-5), (2-6), and (2-7) may be replaced by an acrylic group, and m and n in the formulas (2-3), (2-5), and (2-7) are the same as or different from each other and each represent an integer of 1 to 12.

9. The monomer material according to claim 8, wherein the photo-alignment monomer is represented by the following formula (3-1), (3-2), (3-3), (3-4), (3-5), (3-6), or (3-7):

(3-1)
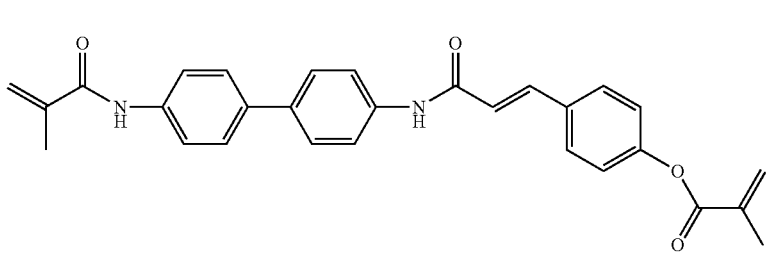

(3-2)
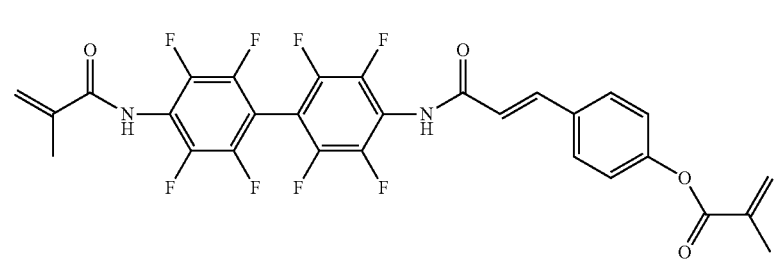

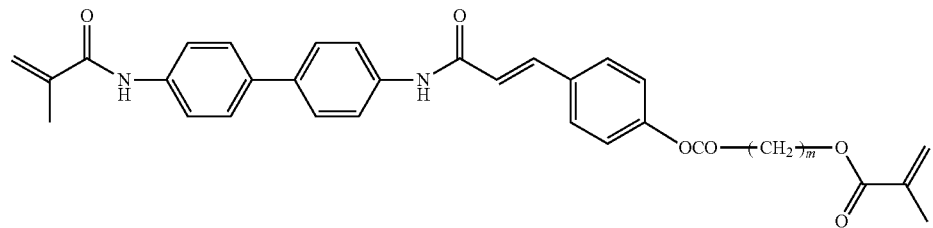
(3-3)
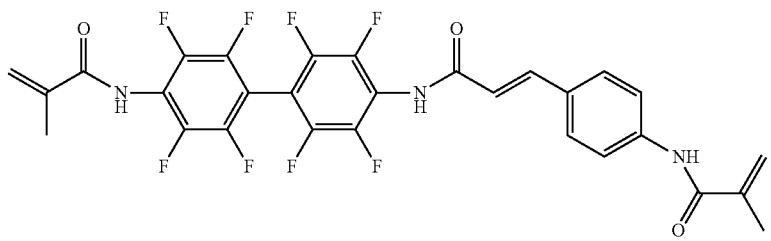
(3-4)
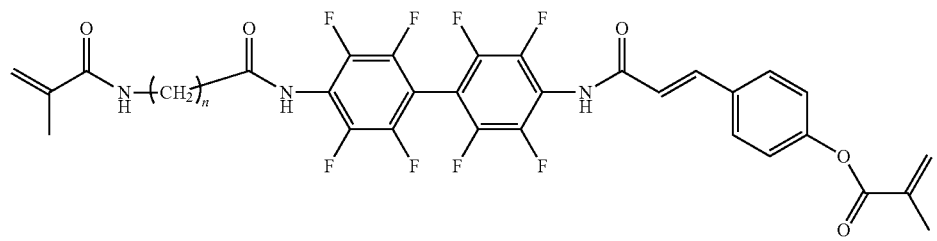
(3-5)
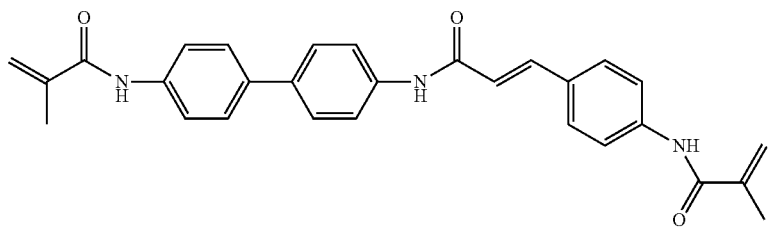
(3-6)
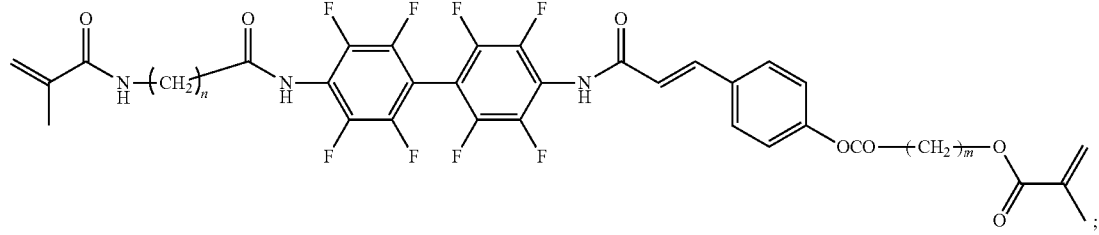
(3-7)
and
wherein, any methacrylic group in the formulas (3-1), (3-2), (3-3), (3-4), (3-5), (3-6), and (3-7) may be replaced by an acrylic group, and m and n in the formulas (3-3), (3-5), and (3-7) are the same as or different from each other and each represent an integer of 1 to 12.
* * * * *